(12) United States Patent
Sosnowski

(10) Patent No.: US 11,009,056 B2
(45) Date of Patent: May 18, 2021

(54) CONNECTION APPARATUS FOR COLLAPSIBLE STRUCTURES

(71) Applicant: NTH Innovations, LLC, Boonton, NJ (US)

(72) Inventor: Blaze Henry Sosnowski, Boonton, NJ (US)

(73) Assignee: NTH Innovations, LLC, Boonton, NJ (US)

( * ) Notice: Subject to any disclaimer, the term of this patent is extended or adjusted under 35 U.S.C. 154(b) by 0 days.

(21) Appl. No.: 16/563,328

(22) Filed: Sep. 6, 2019

(65) Prior Publication Data

US 2019/0390695 A1    Dec. 26, 2019

Related U.S. Application Data

(63) Continuation-in-part of application No. 15/918,133, filed on Mar. 12, 2018, now Pat. No. 10,633,885, which is a continuation-in-part of application No. 14/568,489, filed on Dec. 12, 2014, now Pat. No. 9,915,081.

(Continued)

(51) Int. Cl.
*F16B 7/04* (2006.01)
*E04H 15/60* (2006.01)
*A45B 9/00* (2006.01)

(52) U.S. Cl.
CPC ............... *F16B 7/042* (2013.01); *A45B 9/00* (2013.01); *E04H 15/60* (2013.01); *A45B 2009/005* (2013.01)

(58) Field of Classification Search
CPC ..... Y10T 403/32073; Y10T 403/32581; Y10T 403/32409; Y10T 403/32221; Y10T 403/125; Y10T 403/32991; F16C 11/045; F16C 11/10; F16C 11/0619; F16C 11/106; E04H 15/48; E04H 15/44; E04H 12/187; E04H 15/60; E04H 2015/326;
(Continued)

(56) References Cited

U.S. PATENT DOCUMENTS 2,191,348 A * 2/1940 Lauterbach ............ A47L 13/24
403/93
2,589,042 A    3/1952 Brenneman
(Continued)

*Primary Examiner* — Theodore V Adamos
(74) *Attorney, Agent, or Firm* — Rita C. Chipperson, Esq.; Chipperson Law Group, P.C.

(57) ABSTRACT

A collapsible structure connection system and method including an apparatus having a pair of mated ferrules or rod segments and a spring-loaded push-button locking mechanism, the spring-loaded push-button locking mechanism having a spring-loaded push-button seated on a dowel of a male ferrule or mail rod segment, and a cavity aperture traversing a dowel cavity of a female ferrule or female rod segment. Each ferrule couples to a rod segment of the structure, the ferrules connecting the rod segments when mated, but allowing the rod segments to disengage into a collapsed structure. An exemplary embodiment of the apparatus and collapsible structure connection system includes a pair of mated ferrules or rod segments, one pivoting pin and at least one slider arm. The slider arm rotates around the pivoting pins, allowing the ferrules or rod segments to rotate into various positions when selectively connecting and collapsing rod segments.

17 Claims, 16 Drawing Sheets

Related U.S. Application Data

(60) Provisional application No. 61/915,941, filed on Dec. 13, 2013.

(58) Field of Classification Search
CPC ......... E04H 15/425; E05D 3/18; F16B 7/042; A45B 19/08; A45B 2009/005; A45B 9/00
USPC ........ 403/52, 61, 72, 79, 80, 53, 93, 96, 97, 403/98, 300, 116, 345, 347, 359.3, 101
See application file for complete search history.

(56) References Cited

U.S. PATENT DOCUMENTS

| | | | |
|---|---|---|---|
| 2,818,291 A | 12/1957 | Corns | |
| 2,993,254 A | 7/1961 | Larson | |
| 3,426,367 A * | 2/1969 | Bradford | A47C 17/705 5/626 |
| 3,521,519 A | 7/1970 | Chester | |
| 4,131,378 A * | 12/1978 | Daws | E05D 3/12 16/287 |
| 4,365,908 A | 12/1982 | Thiboutot | |
| 4,437,480 A * | 3/1984 | Husa | A61H 3/02 135/74 |
| 4,527,579 A | 7/1985 | Knotter et al. | |
| 4,528,998 A * | 7/1985 | Gamm | A45B 9/00 135/75 |
| 4,603,904 A * | 8/1986 | Tolleson | A47C 7/445 297/296 |
| 4,611,946 A * | 9/1986 | Gebelius | F16C 11/12 135/114 |
| 4,641,395 A | 2/1987 | Banks | |
| 4,806,042 A | 2/1989 | Swank et al. | |
| 4,869,552 A * | 9/1989 | Tolleson | A47C 7/445 297/296 |
| 5,178,583 A | 1/1993 | Rankin | |
| 5,217,315 A | 6/1993 | Rosane | |
| 5,255,994 A | 10/1993 | Stein | |
| 5,584,311 A | 12/1996 | Schaefer | |
| 5,681,045 A | 10/1997 | Liao | |
| 5,746,533 A | 5/1998 | Schmidt | |
| 5,895,167 A | 4/1999 | Chang | |
| 5,904,397 A * | 5/1999 | Fismen | A47C 7/024 297/291 |
| 6,042,297 A | 3/2000 | Lah | |
| 6,089,247 A | 7/2000 | Price | |
| 6,200,060 B1 | 3/2001 | Vernay | |
| 6,216,717 B1 | 4/2001 | Chen | |
| 7,017,234 B2 | 3/2006 | Anderson | |
| 7,438,496 B2 | 10/2008 | Moore | |
| 8,776,813 B2 | 7/2014 | Delap et al. | |
| 8,813,768 B2 * | 8/2014 | Lee | E04H 15/60 135/114 |
| 9,915,081 B2 | 3/2018 | Sosnowski et al. | |
| 2002/0064417 A1 | 5/2002 | Feng | |
| 2003/0086752 A1 | 5/2003 | Lemole | |
| 2004/0036222 A1 | 2/2004 | Chou | |
| 2006/0046899 A1* | 3/2006 | Wang | A63B 71/023 482/27 |
| 2006/0102218 A1* | 5/2006 | Kwon | E04H 15/60 135/114 |
| 2008/0213039 A1* | 9/2008 | Chen | A47D 13/10 403/325 |
| 2009/0057505 A1 | 3/2009 | Chen | |
| 2012/0167935 A1* | 7/2012 | Lee | E04H 15/60 135/120.3 |
| 2013/0243522 A1 | 9/2013 | Jordan | |
| 2014/0251400 A1* | 9/2014 | Jin | E04H 15/46 135/120.3 |
| 2015/0167345 A1* | 6/2015 | Sosnowski | E04H 15/48 403/4 |

* cited by examiner

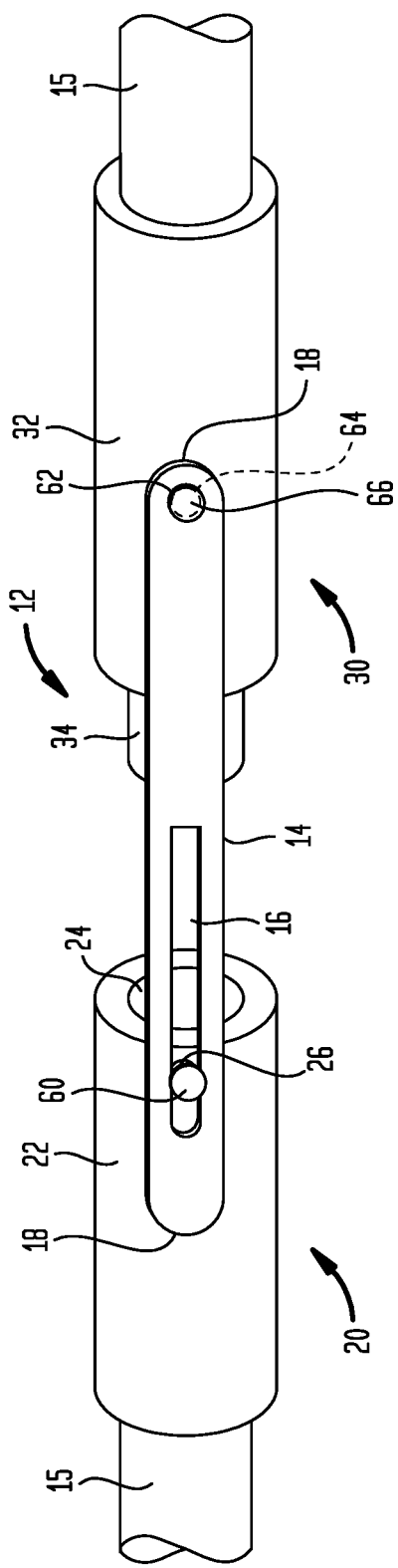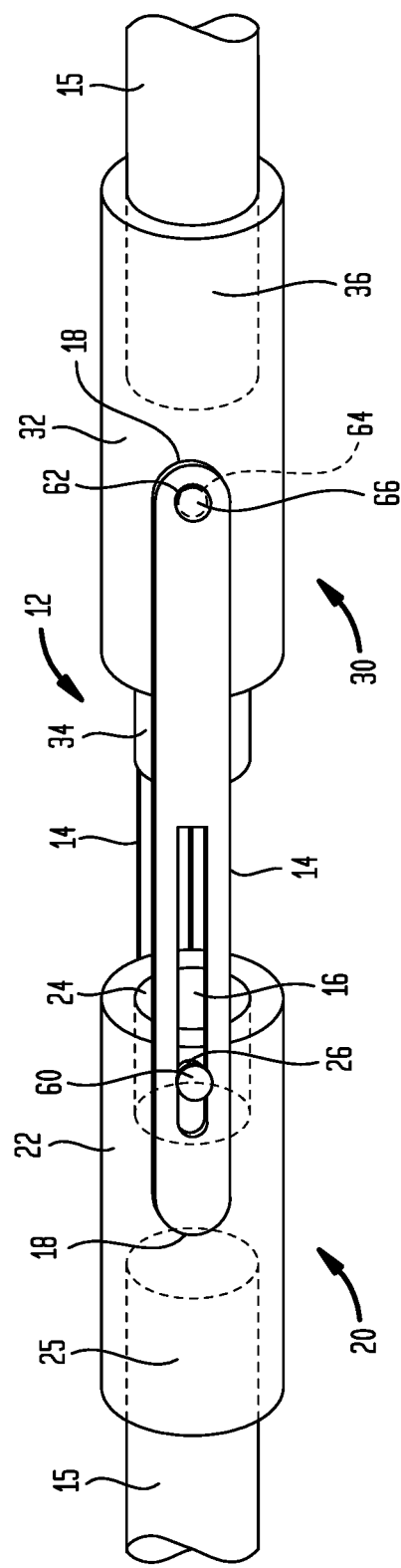

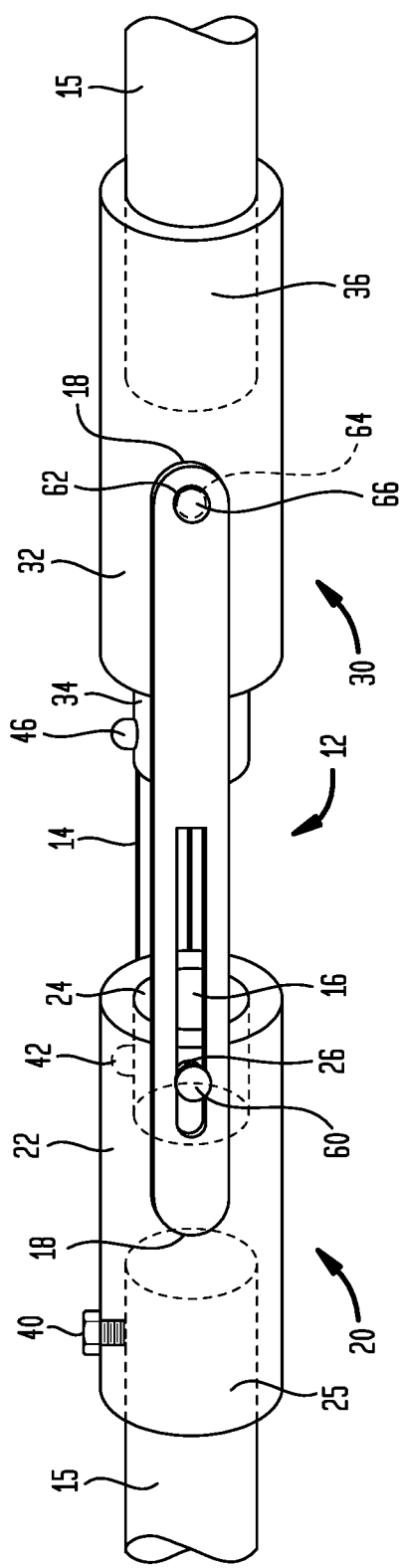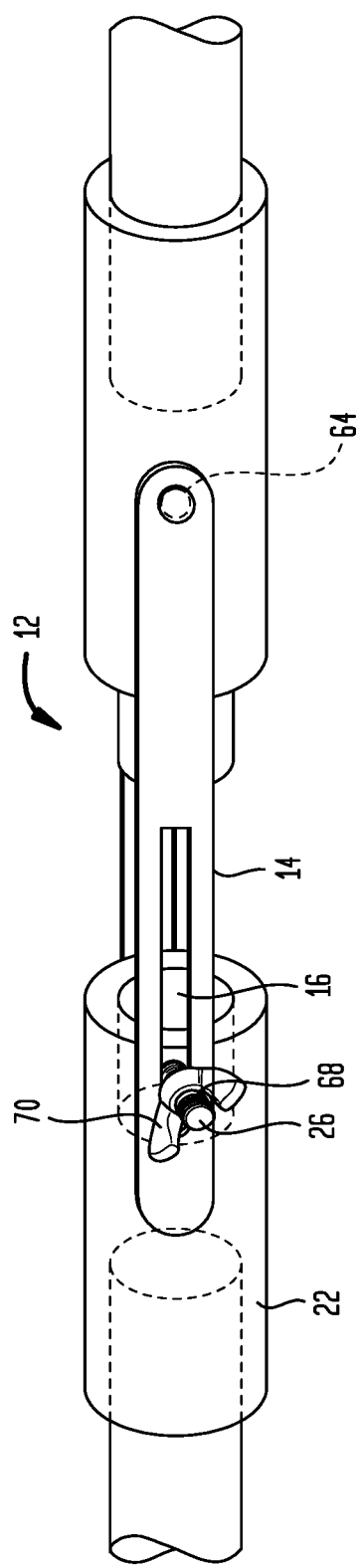

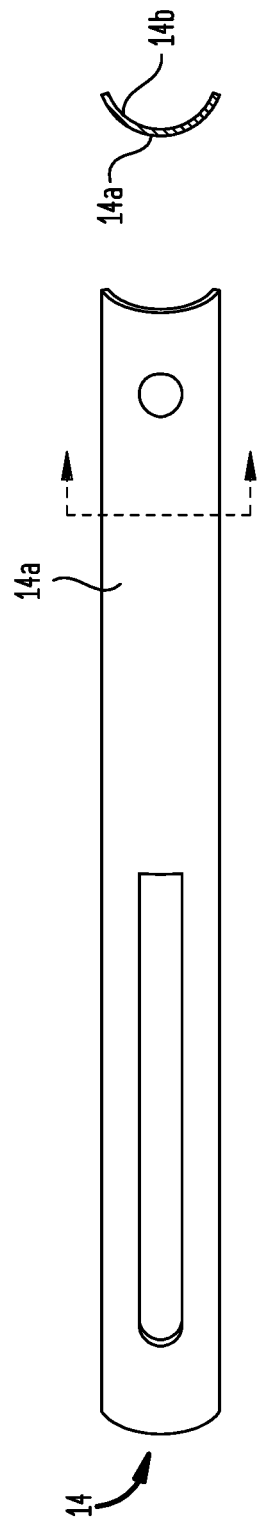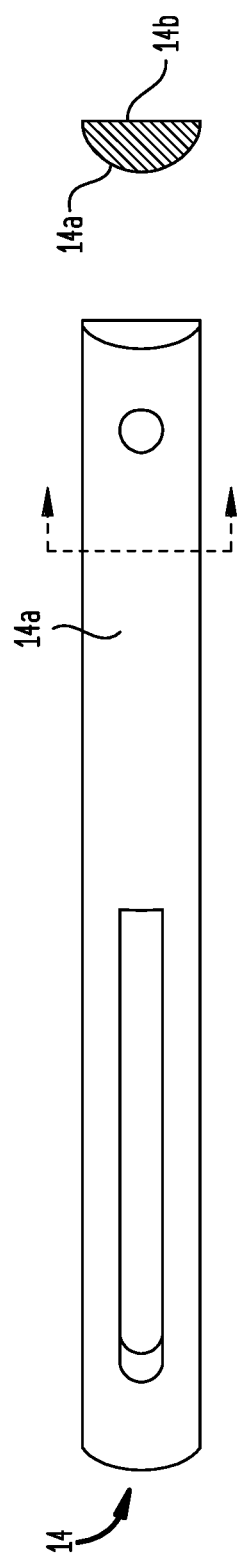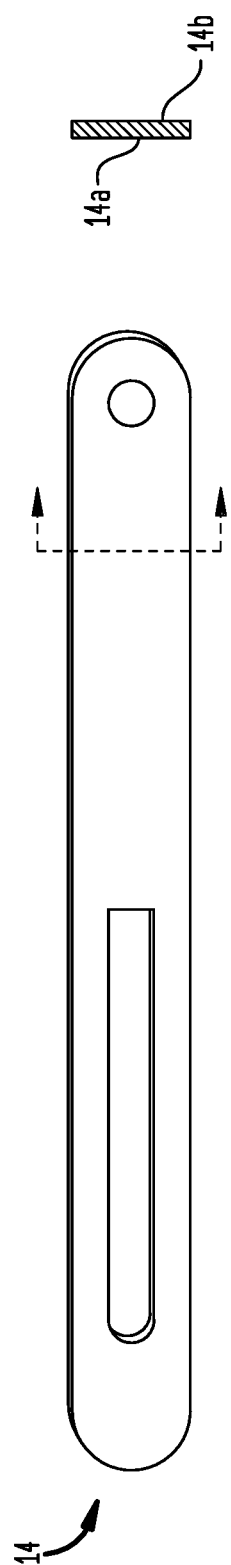

FIG. 10A
FIG. 10B
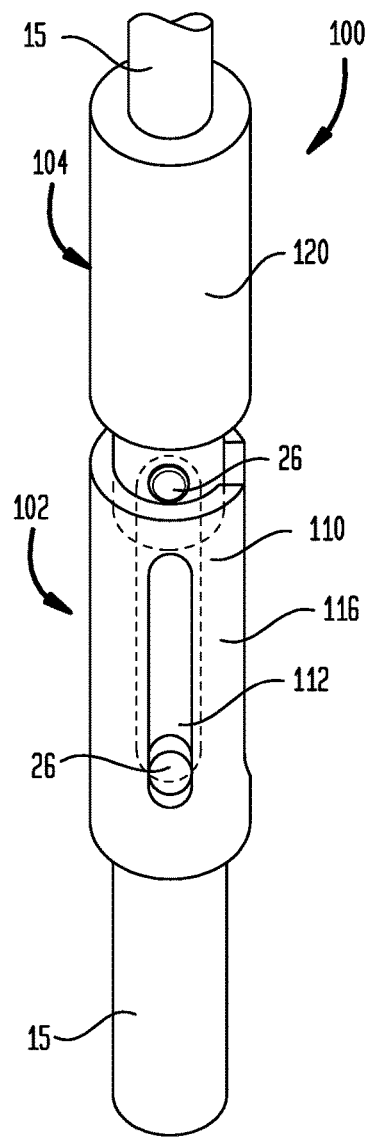
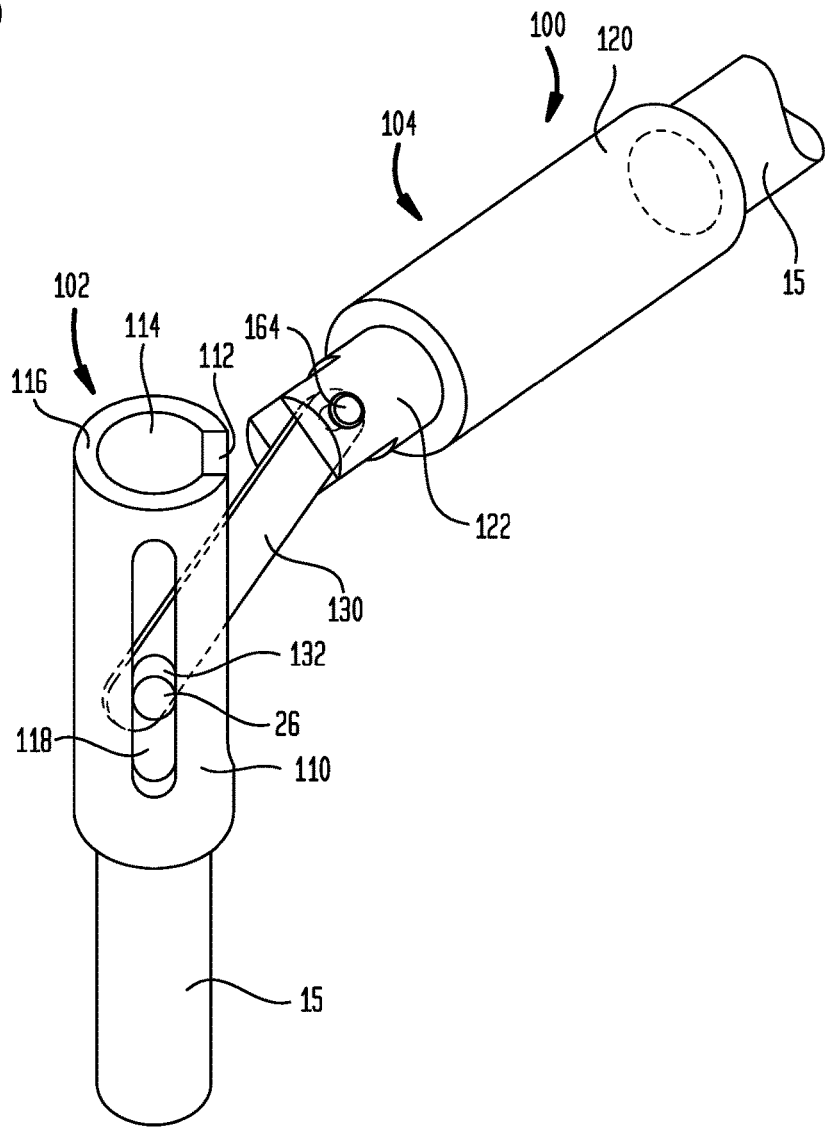

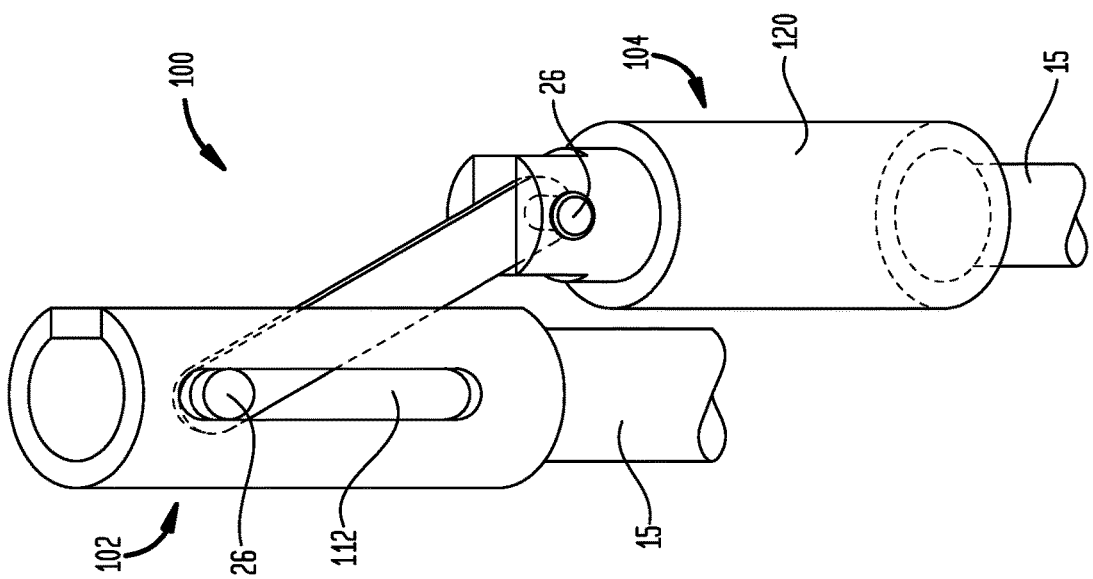
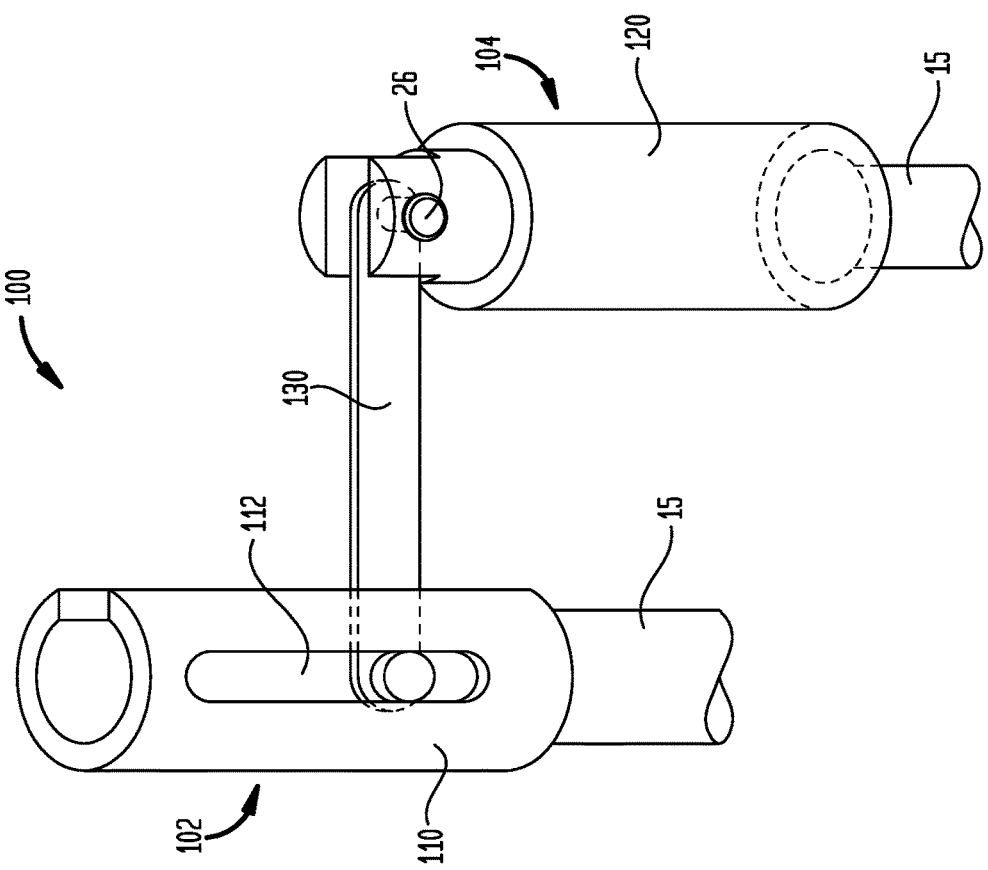

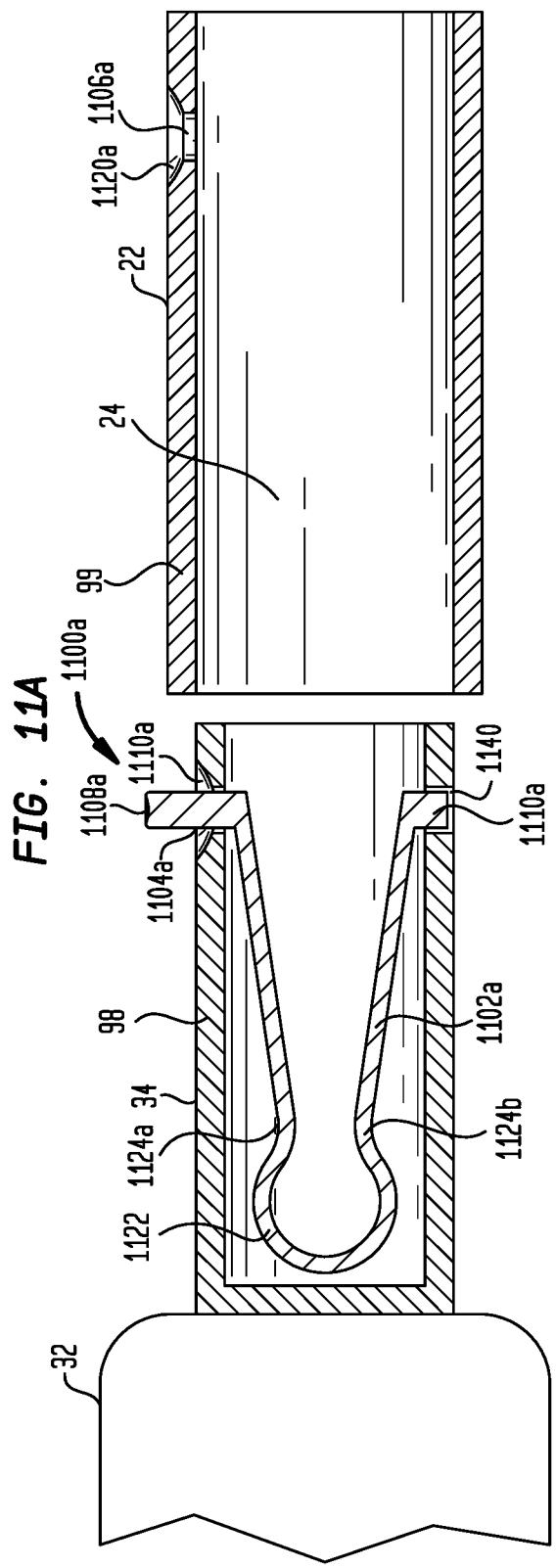
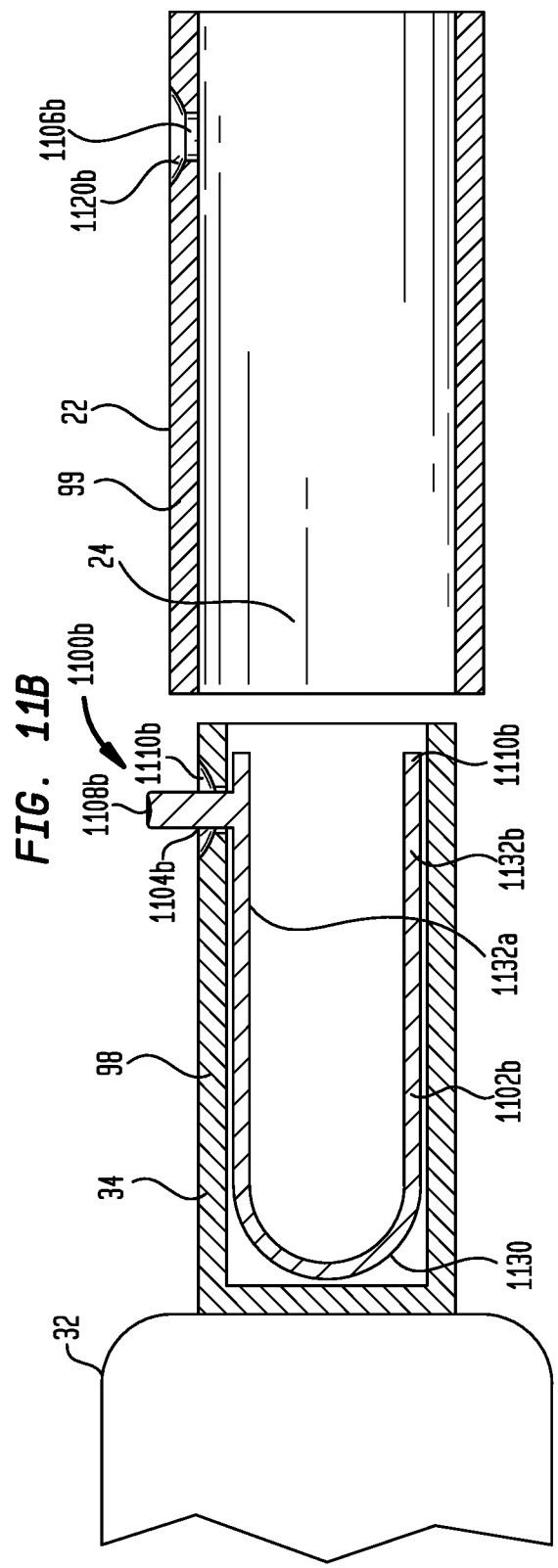

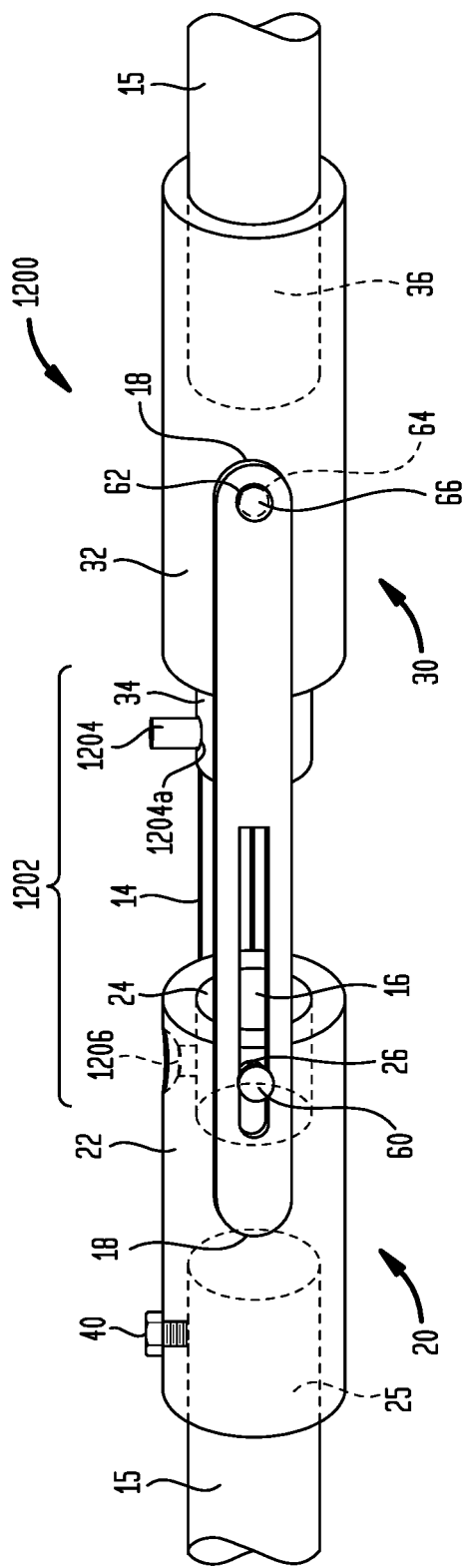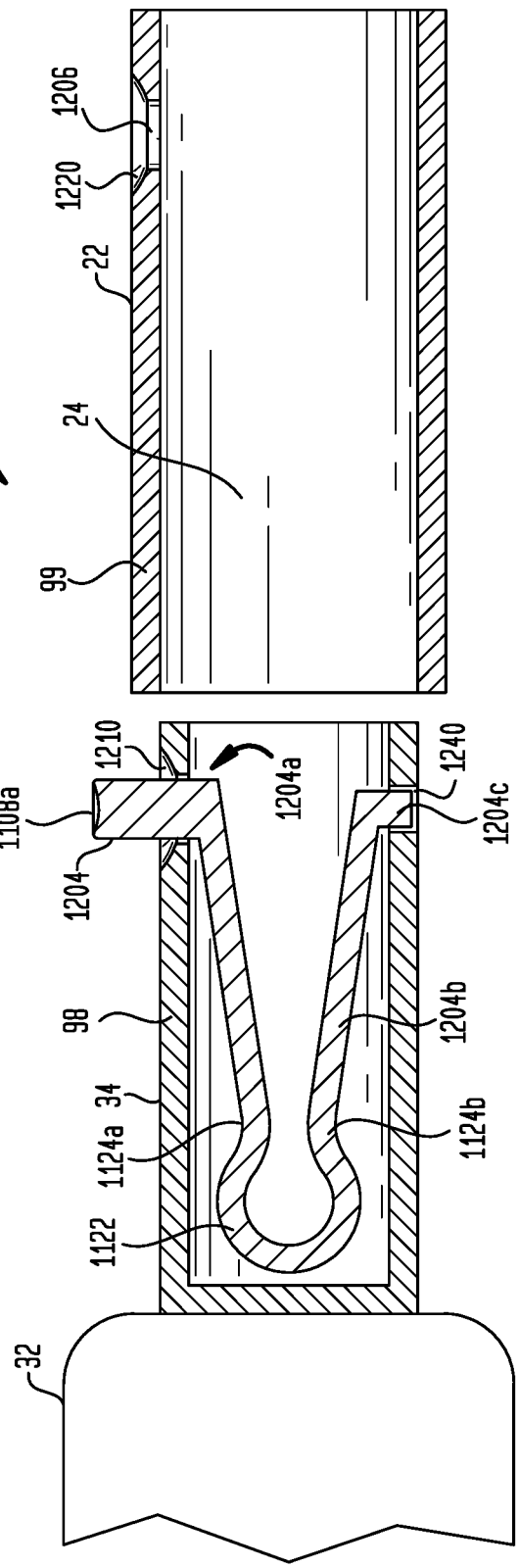
FIG. 12A
FIG. 12B

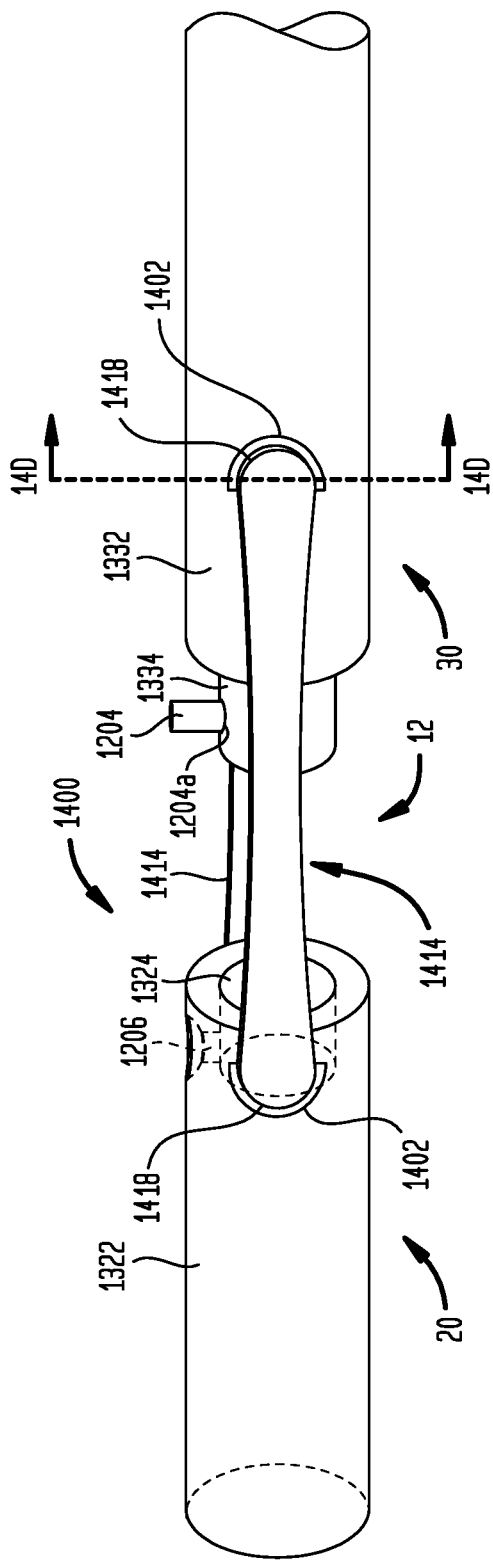
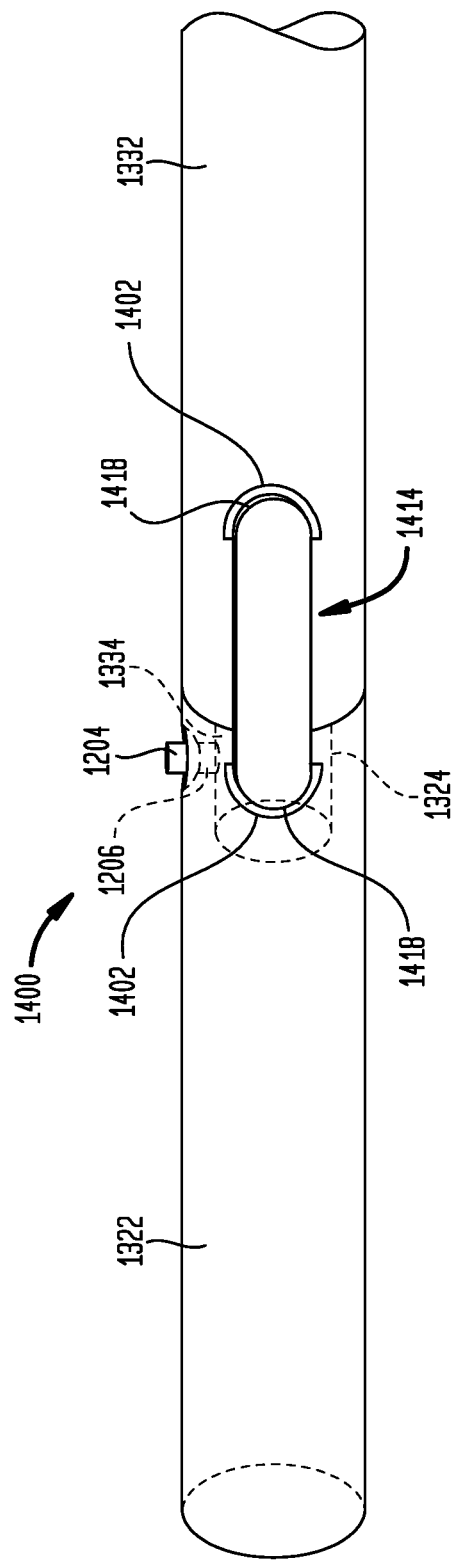

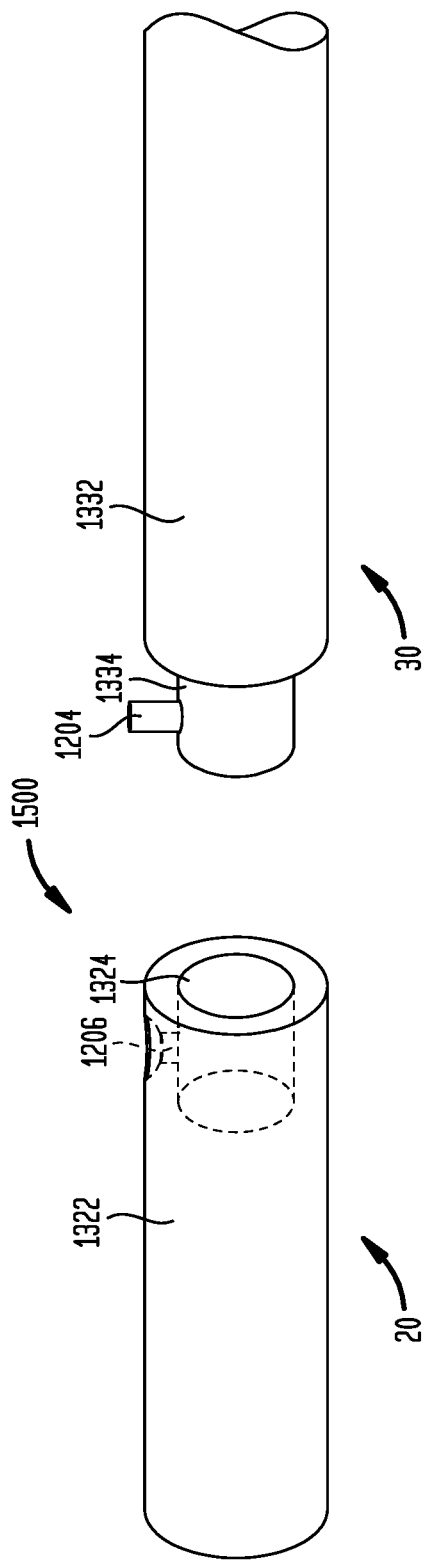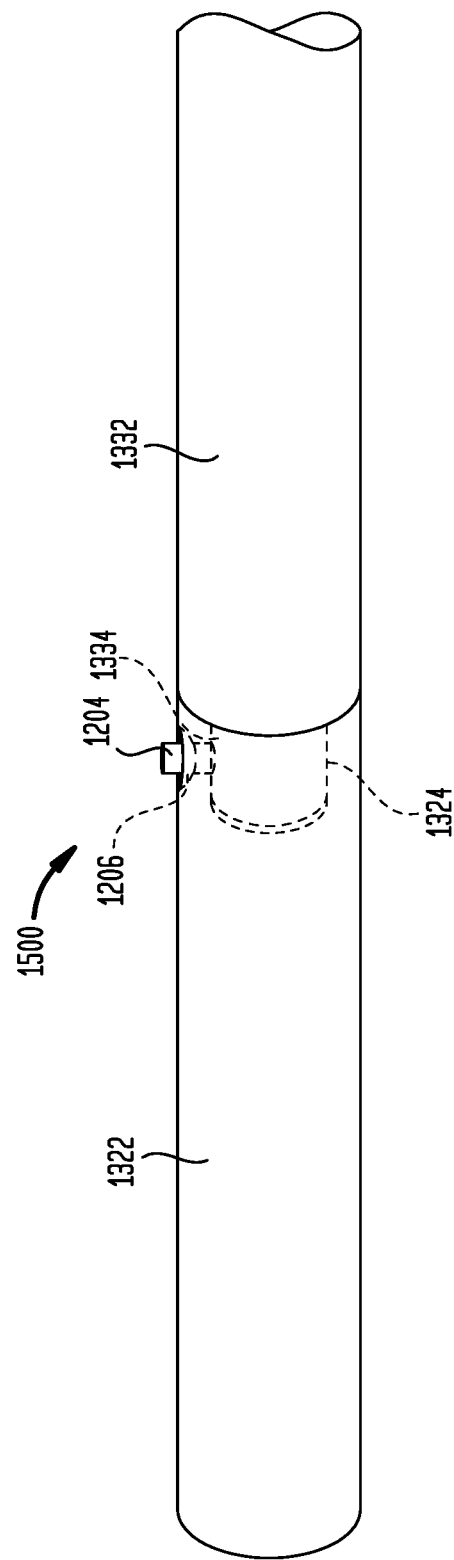

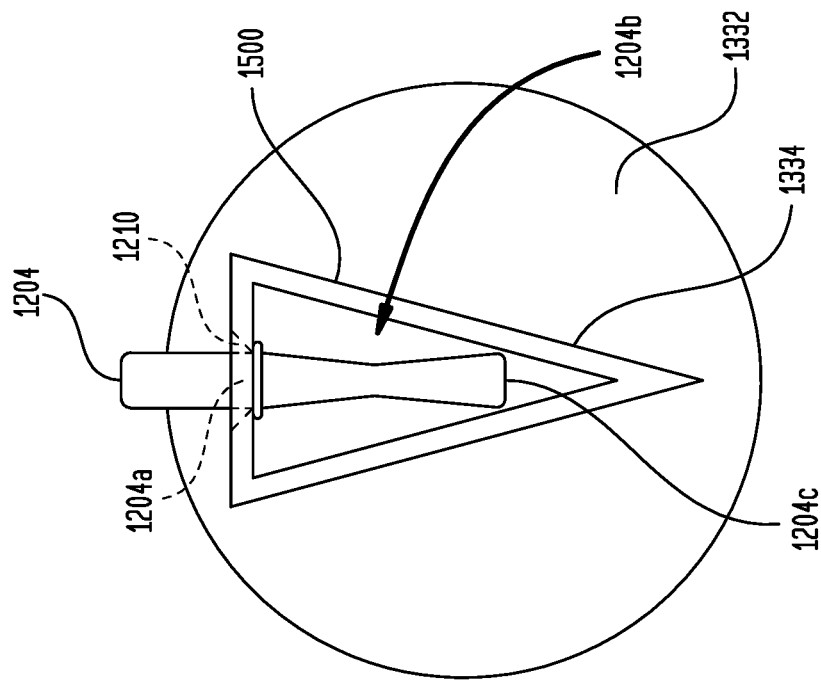
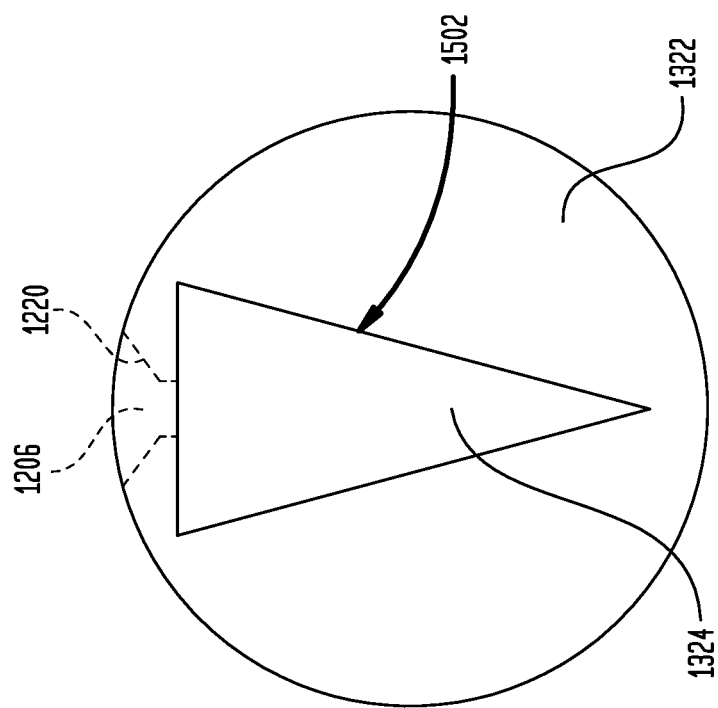
FIG. 15C

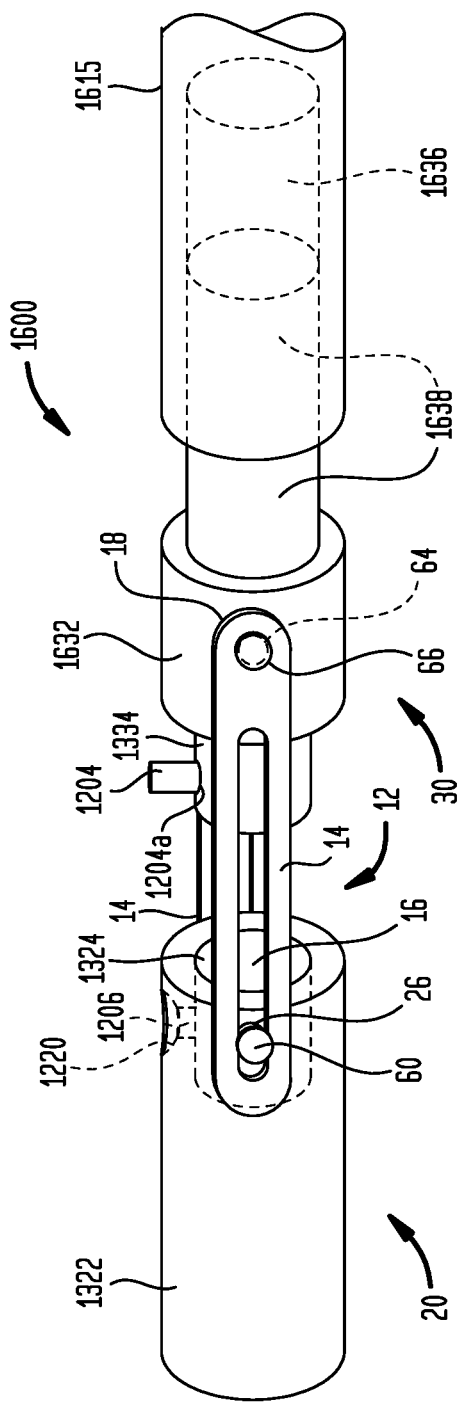
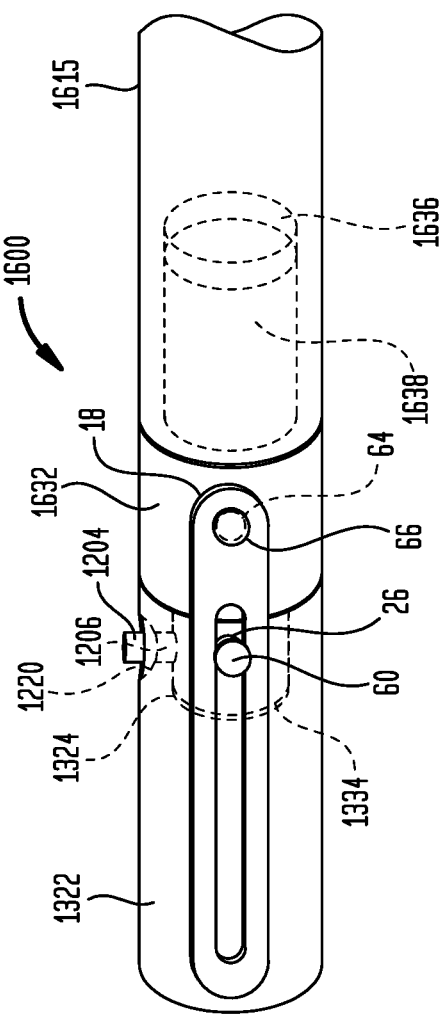

CONNECTION APPARATUS FOR COLLAPSIBLE STRUCTURES

CROSS-REFERENCE TO RELATED APPLICATIONS

This application is a continuation-in-part of the U.S. non-provisional patent application entitled "Connection Apparatus, System, and Methods for Collapsible Structures," having Ser. No. 15/918,133, filed Mar. 12, 2018, which itself is a continuation-in-part of and claims the benefit of U.S. non-provisional patent application entitled "Connection Apparatus, System, and Methods for Collapsible Structures," having Ser. No. 14/568,489, filed Dec. 12, 2014, and issued on Mar. 13, 2018, as U.S. Pat. No. 9,915,081 B2, which claims the benefit of the U.S. provisional patent application entitled "Connection Apparatus, System, and Methods for Collapsible Structures," having Ser. No. 61/915,941, filed Dec. 13, 2013, each of which is hereby incorporated by reference in its entirety as if fully set forth herein.

BACKGROUND OF THE INVENTION

Embodiments of the present disclosure generally relate to apparatus, systems, and methods for connecting collapsible structures. More specifically, embodiments of the present disclosure relate to an apparatus, systems and methods for forming a rigid joint between rods or rod segments that selectively collapses when released.

Structures such as tents are intended to be portable, allowing the tent dweller to assemble the structure, dwell within, collapse the structure, pack it up and move it to another site or store it.

Many styles of tents have an internal framework of support poles for the tent skin. It is desirable that the poles be collapsible, having articulated joints, so that the poles fold for easy storage and portability. Additionally, when the poles extend, it is equally desirable that the poles form a rigid support framework.

In addition to tent poles, collapsible connecting rods are found in other temporary structures such as frameworks for canopies (e.g., wedding canopies), gazebos, trellises and kiosks and enclosed spaces, such as temporary and/or semi-permanent utility structures.

Collapsible connecting rods are also useful in walking aids, such as crutches, canes, walking poles, walking sticks and other walking aids. It is especially important that the joint formed between the connecting rods is sufficiently strong and rigid to support the weight of the user, yet collapsible for easy stowing of the walking aid in public places.

Collapsible connecting rods are useful in other diverse areas, such as in the struts of a collapsible airplane wing, and umbrellas, especially beach umbrellas. Additionally, the apparatus, systems, and methods may form tower(s) or pole(s) to support telephone or electrical wire or other materials which need support for proper construction or use, by allowing incremental section(s) to be individually assembled to attain the desired height or width.

BRIEF SUMMARY OF THE INVENTION

Briefly stated, in one aspect of the present invention, an apparatus for connecting rod segments is provided. The apparatus includes: a slider arm having a pair of solid ends and a through slot extending longitudinally through at least a portion of the slider arm and proximal to a first of the pair of solid ends; a rotating assembly having a female ferrule coupling to a first of the rod segments, the female ferrule having a dowel cavity opposite the first rod segment, the rotating assembly having a first pivoting pin, the first pivoting pin passing through the through slot and coupling the female ferrule to the slider arm; and a fixed assembly having a male ferrule coupling to a second of the rod segments, the male ferrule having a dowel opposite the second rod segment configured for mating with the dowel cavity of the female ferrule, the fixed assembly having a second pivoting pin, the second pivoting pin passing through an aperture in a second of the pair of solid ends and coupling the male ferrule to the slider arm; wherein the slider arm and the rotating assembly pivot around the second pivoting pin, the first pivoting pin sliding through the through slot as the dowel inserts into the dowel cavity to connect the first rod segment on the rotating assembly to the second rod segment on the fixed assembly. It should be noted that although pivoting pins are depicted in the drawings hereof, any suitable mechanism may be substituted including, but not limited to, barrel bolts.

Briefly stated, in another aspect of the present invention, a method for connecting rod segments with an apparatus is provided. The method includes: permanently or removably coupling an apparatus to a pair of rod segments, the apparatus including: a slider arm having a pair of solid ends and a through slot extending longitudinally through at least a portion of the slider arm and proximal to a first of the pair of solid ends; a rotating assembly having a female ferrule coupling to a first of the rod segments, the female ferrule having a dowel cavity opposite the first rod segment, the rotating assembly having a first pivoting pin, the first pivoting pin passing through the through slot and coupling the female ferrule to the slider arm; and a fixed assembly having a male ferrule coupling to a second of the rod segments, the male ferrule having a dowel opposite the second rod segment configured for mating with the dowel cavity of the female ferrule, the fixed assembly having a second pivoting pin, the second pivoting pin passing through an aperture in a second of the pair of solid ends and coupling the male ferrule to the slider arm; and inserting the dowel into the dowel cavity to couple the rod segments, the first pivoting pin moving through the through slot during the inserting.

BRIEF DESCRIPTION OF THE SEVERAL VIEWS OF THE DRAWINGS

The foregoing summary, as well as the following detailed description of preferred example embodiments, will be better understood when read in conjunction with the appended drawings. For the purpose of illustrating the invention, there is shown in the drawings example embodiments which are presently preferred. It should be understood, however, that this disclosure is not limited to the precise arrangements and instrumentalities shown. In the drawings:

FIG. 1 is a perspective view of a system and apparatuses for connecting rods having a single slider arm in accordance with an example embodiment of the present disclosure;

FIG. 2 is a perspective view of an alternate example embodiment of a system and apparatuses for connecting rods having two slider arms and removable rod segments in accordance with an example embodiment of the present disclosure;

FIG. 3 is a perspective view of yet another alternate example embodiment of a system and apparatuses for connecting rods having locking mechanisms for coupling a ferrule to a rod segment and for coupling the ferrules to each other in accordance with an example embodiment of the present disclosure;

FIG. 4 is a perspective view of a further alternate example embodiment of a system and apparatuses for connecting rods having a locking mechanism for fixing a ferrule to the slider bar in a fixed position in accordance with an example embodiment of the present disclosure;

FIGS. 8A-8C are perspective views of exemplary slider arms for use with the system and apparatuses for connecting rods;

FIGS. 10A-10D are multi-stage views of a method for disconnecting the rods using the system and apparatus of FIG. 9 in accordance with an example embodiment of the present disclosure;

FIGS. 11A and 11B depict an optional locking mechanism for use with embodiments of the present invention such as those shown in FIGS. 1 and 2 in accordance with an example embodiment of the present disclosure;

FIGS. 12A and 12B depict an optional spring-loaded push-button lock mechanism for use with exemplary embodiments of the present invention in accordance with aspects of the invention;

FIGS. 14A-14C depict the spring-loaded push-button lock mechanism of FIG. 12A used with exemplary elastomeric connectors in exemplary unibody construction embodiments of the present invention in accordance with aspects of the invention;

FIGS. 15A-15C depict the spring-loaded push-button lock mechanism of FIG. 12A for use without the elastomeric connectors of FIGS. 14A and 14B or slider arm(s) in an exemplary unibody construction embodiment of the present invention in accordance with aspects of the invention.

FIGS. 16A-16B depict a spring-loaded push-button lock mechanism adapted to slide inside a rod segment of an exemplary embodiment of the present invention in accordance with aspects of the invention.

DETAILED DESCRIPTION OF THE INVENTION

Figure 5:
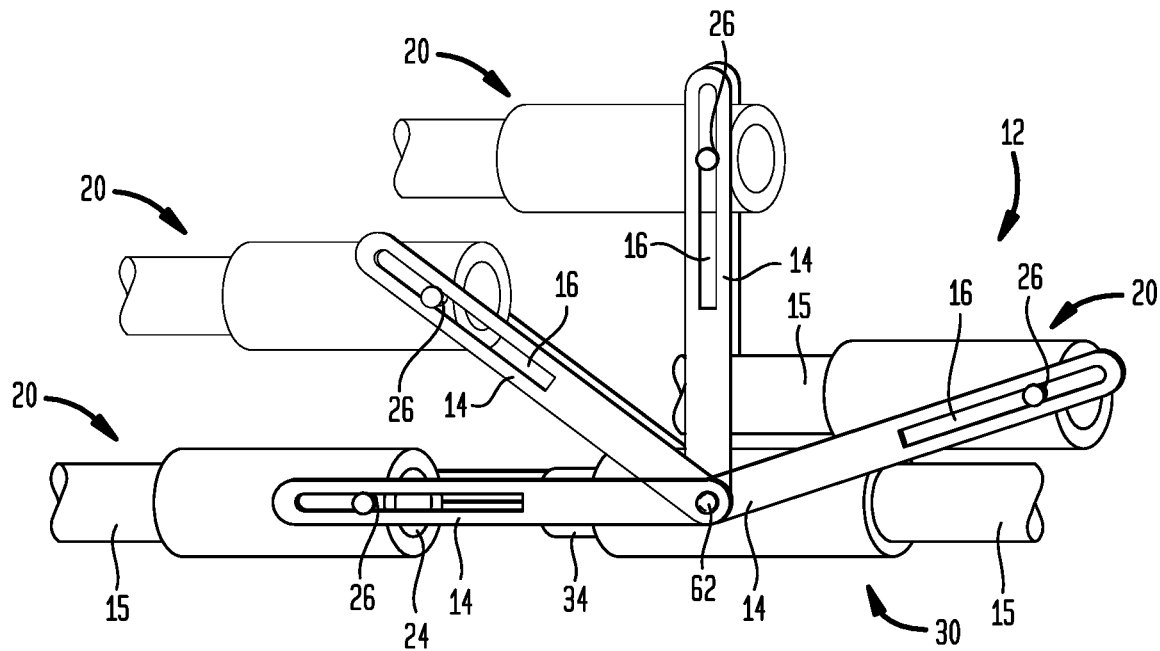
FIG. 5 is a multi-stage view of a method for connecting rods in accordance with one embodiment of the present disclosure.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventors also contemplate aspects of the disclosure described by the plural of that term. As used in this specification and in the appended claims, the singular forms "a", "an" and "the" include plural references unless the context clearly dictates otherwise, e.g., "an arm" may include a plurality of arms. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the present disclosure, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Briefly stated, one aspect of the present disclosure is to provide an apparatus for connecting collapsible structures that allows a pair of rod segments of a structure to easily connect. Accordingly, the present disclosure provides an apparatus having a pair of mated ferrules, each ferrule coupled to a rod segment, the ferrules connecting the rod segments when mated.

It should be noted that the term "rod" as used herein is not intended to be limited to cylindrical rods. Rods and rod segments may include cross sections of any shape including, without limitation, substantially circular, substantially ovate, substantially square, substantially rectangular, and substantially triangular.

Another aspect of the present disclosure is to provide an apparatus for connecting collapsible structures that allows the rod segments of a structure to easily collapse and fold for storage. Accordingly, the present disclosure provides an apparatus having a pair of mated ferrules, each ferrule coupled to a rod segment, the ferrules coupled by an arm, the ferrules with the rod segments separating and the arm rotating the ferrule/rod combinations into a collapsed state for storage.

In yet another aspect of the present disclosure, a system for connecting collapsible structures that allows a pair of rod segments of a structure to easily connect and easily collapse is provided. Accordingly, the present disclosure provides a system having an apparatus, a bracket, and a locking device, the apparatus connecting and collapsing the rod segments, the locking device locking the apparatus in a connected position, and the bracket maintaining the rod segments in a collapsed position.

In still another aspect of the present disclosure, a method for connecting collapsible structures that allows a pair of rod segments of a structure to easily connect and easily collapse is provided. This method includes connecting rod segments with mated ferrules that allow the rod segments to rotate from a connected position into a collapsed disconnected position.

The present disclosure describes a collapsible structure connection system, method and an apparatus having a pair of mated ferrules, at least one pivoting pin and at least one slider arm. Each ferrule couples to a rod segment of the structure, the ferrules connecting the rod segments when mated, but allowing the rod segments to rotate into a collapsed structure. The apparatus has a locking system in one example embodiment, locking the ferrules when mated. The system includes a bracket, and at least one locking device to maintain the rod segments in a preferred configuration. An alternate apparatus and collapsible structure connection system includes a pair of mated ferrules each having a lengthwise slot, a connector arm and pivoting pins. The connector arm rotates around the pivoting pins within the slots of the ferrules, allowing the ferrules to rotate into various positions when selectively connecting and collapsing rod segments.

FIG. 1 illustrates an example embodiment of an apparatus 12 for connecting rod segments 15. The apparatus 12 has a pair of assemblies coupled by a slider arm 14, namely, a first rotating assembly 20 and a second fixed assembly 30. Each assembly has a ferrule coupled to a rod segment 15. The ferrules of the assemblies are mated, one assembly having a female ferrule 22 and one assembly having a male ferrule 32. Although the rod segments 15 shown in the accompanying figures have a circular cross section, alternately shaped cross sections may be substituted including, without limitation, square and rectangular.

In the illustrations and as described hereinbelow, the rotating assembly 20 includes the female ferrule 22 and the fixed assembly 30 includes the male ferrule 32. It is understood by those of ordinary skill that the pairing can be reversed and that the rotating assembly 20 can include the male ferrule 32 and the fixed assembly 30 can include the female ferrule 22 within the inventive concept.

In one example embodiment, each ferrule and rod segment 15 is a unitary piece. In another example embodiment, the ferrules couple to the rod segments as disclosed hereinbelow.

As shown in the illustrations, the female ferrule 22 is configured for the rotating assembly 20 and the male ferrule 32 is configured for the fixed assembly 30. The female ferrule 22 has a cavity 24 opposite the rod segment 15 coupled to the female ferrule 22. The male ferrule 32 has a dowel 34 opposite the rod segment 15 coupled to the male ferrule 32. The dowel 34 is configured for snugly inserting into the cavity 24 of the female ferrule 22.

The slider arm 14 has a slot 16 extending lengthwise through the arm 14. The rotating assembly 20 is coupled to the slider arm 14 via a pivoting pin 26, the body of which passes through slot 16, is coupled to female ferrule 22 at a first end and includes a pin head 60 at a second end. In the depicted embodiment, pin head 60 has a greater diameter than the width of slot 16, thereby preventing dislodgment of pivoting pin 26 from slider arm 14.

The slider arm 14 also has a pair of solid ends 18. The fixed assembly 30 is coupled to slider arm 14 via a pivoting pin 62, the body of which passes through an aperture 64 in the end 18 located proximal to the fixed assembly 30. Pivoting pin 62 is coupled to male ferrule 32 at a first end and includes a pin head 66 at its second end. Pin head 66 has a greater diameter than the width of aperture 64, thereby preventing dislodgment of pivoting pin 62 from slider arm 14. As shown in FIGS. 1-3, pivoting pin 26 and 62 are rivets with one peened head, but alternate embodiments are envisioned in which the pivoting pin has peened heads on both ends and the pins pass through the respective ferrule. Also, alternate pivoting pins other than rivets may be substituted without departing from the scope hereof.

The slider arm 14 with the attached rotating assembly 20 pivots around the pivoting pin 62 of the fixed assembly, the first pin 26 of the rotating assembly 20 sliding through the slider arm slot 16. The rotating assembly 20 rotates until the cavity 24 of the rotating assembly 20 aligns with the dowel 34 of the fixed assembly 30. When thus aligned, the male ferrule dowel 34 inserts into the female ferrule cavity 24 connecting the rod segment 15 on the rotating assembly 20 to the rod segment 15 on the fixed assembly 30. The first and second assemblies are held in such position due to the frictional force exerted by the dowel 34 on the internal walls for the cavity 24 until pressure is exerted by the user to remove dowel 34 therefrom.

The connected rod segments 15 are collapsed by withdrawing the dowel 34 of the male ferrule 32 from the cavity 24 of the female ferrule 22 and rotating the slider arm 14 around the pivoting pin 62 until the rotating assembly 20 is substantially parallel to the fixed assembly 30 as demonstrated more fully hereinbelow.

FIG. 2 illustrates a further example embodiment of the apparatus 12. The apparatus 12 has a second slider arm 14 located on the opposite sides of ferrules 22 and 32 from the first slider arm 14. The second slider arm 14 is identical to the first slider arm 14. The second slider arm 12 couples to the rotating assembly 20 via a second pivoting pin 26 identical to the first pivoting pin 26 but located on the opposite side of female ferrule 22. The second slider arm 14 couples to fixed assembly by a second pivoting pin 62 identical to the first pivoting pin 62 but located on the opposite side of male ferrule 32. Or, alternatively, one pivoting pin 62 may pass fully through male ferrule 32 extending through both slider arm slots 14 and having pin heads 66 at the first and second ends thereof. The second slider arm 14 functions the same as the first slider arm 14, adding stability to the connection of the rod segments 15.

FIG. 2 further illustrates the rod segments 15 selectively coupling to the ferrules. In the depicted embodiment, the female ferrule 22 has an additional cavity 25 longitudinally opposite cavity 24, the rod segment 15 selectively inserting into the additional cavity 25 of the female ferrule 22. The male ferrule 32 has a cavity 36 longitudinally opposite the dowel 34, the rod segment 15 selectively inserting into the cavity 36 of the male ferrule 32. It is understood that other example embodiments are possible, for example, apparatus has two slider arms and each ferrule and each rod segment is a unitary piece.

In yet a further example embodiment of the apparatus 12, FIG. 3 shows the female ferrule 22 sliding over the rod segment 15 and a set screw 40 selectively coupling the female ferrule 22 to the rod segment 15. It is understood to those of ordinary skill, although it is not shown in the drawing, the set screw 40 similarly can couple the male ferrule 32 to the rod segment 15 and/or alternate fastening mechanisms may be substituted without departing from the scope hereof.

Additionally, the example embodiment shown in FIG. 3 locks the rod segments 15 together. The dowel 34 of the male ferrule 32 has a spring loaded ball 46 and the cavity 24 of female ferrule 22 has a corresponding indentation 42 such that when the spring loaded ball 46 is pressed down upon inserting the dowel 34 into the female ferrule cavity 24, the ball 46 extends into the indentation 42 upon contact, locking the rod segments 15 together. Although FIG. 3 depicts a spring-loaded ball and indentation, alternate locking mechanisms may be substituted including, without limitation, a spring clip with corresponding indentation for accepting the spring clip.

Yet another alternate embodiment of the present invention is depicted in FIG. 4. In FIG. 4, the pivoting pin 26 has a threaded end 68 in lieu of pin head 60 upon which a fastener 70 may be threaded. Such threading locks slider arm 14 in a fixed position relative to female ferrule 22, thereby minimizing the potential for dowel 34 to dislodge from cavity 24. Although FIG. 4 shows a finger-tightened fastener 70 such as a wing nut as a non-limiting example, alternate fasteners may be substituted including, without limitation, other forms of nuts, a thumb screw, an acorn nut and a lock nut. FIG. 4 only shows one pivoting pin 26 with a fastener 70, but it is understood that one, both or none of the pivoting pins 26 and 62 can be configured with the threaded end 68 and fastener 70. Also, in embodiments incorporating two slider arms, such as that shown in FIG. 2, any one or more of the four pivoting pins 26 and 62, or none, may be configured with the threaded end 68 and fastener 70 without departing from the scope hereof.

FIG. 5 shows a multi-stage view of a method for connecting the rod segments 15 with an apparatus 12, wherein the methods involves rotating the slider arm 14 with the attached rotating assembly 20 around the pivoting pin 62 of the fixed assembly 30, the first pin 26 of the rotating assembly sliding through the slider arm slot 16 until the cavity 24 of the rotating assembly 20 aligns with the dowel 34 of the fixed assembly 30. The dowel 34 inserts into the female ferrule cavity 24 connecting the rod segment 15 on the rotating assembly 20 to the rod segment 15 on the fixed assembly 30 as shown in FIG. 7.

Referring again to FIG. 5, the connected rod segments 15 collapse by withdrawing the dowel 34 of the fixed assembly 30 from the cavity 24 of the rotating assembly 20 and rotating the slider arm 14 around the pivoting pin 62 until the rotating assembly 20 is substantially parallel to the fixed assembly 30. In FIG. 5, the rod segments 15 are pointing in opposing directions. It is understood by those of ordinary skill that the rotating assembly 20 is capable of rotating 180 degrees so that the rotating assembly 20 and fixed assembly 30 are substantially parallel and the rod segments 15 point in the same directions.

Figure 7:
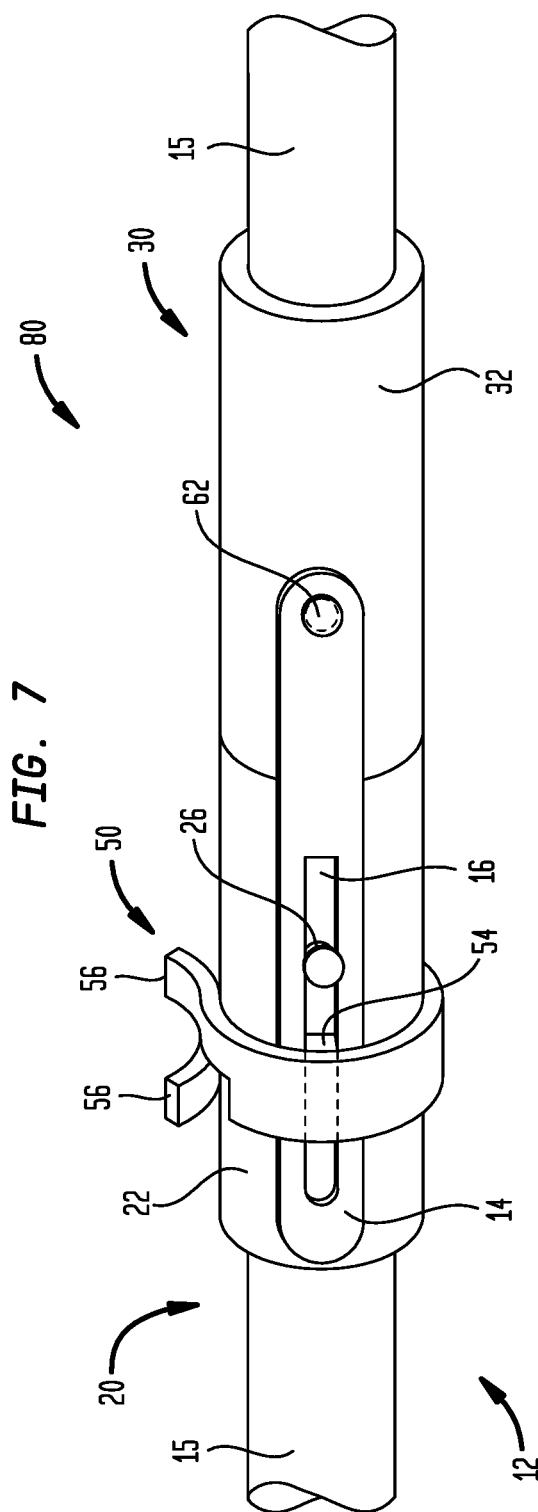
FIG. 7 is a perspective view of a system and apparatuses for connecting rods having a locking mechanism for locking the ferrules in place relative to each other in accordance with an example embodiment of the present disclosure.

FIG. 7 further illustrates a system and method for locking the rod segments 15 of the connecting rod 80 in place by placing a locking device 50 as a brake around the apparatus 12 and through the slot 16 of slider arm(s) 14 of the apparatus, thereby preventing movement of the components of apparatus 12 relative to pivoting pin 26. In the depicted embodiment, locking device 50 is a wire clamp such as a spring band clamp, but alternate locking devices may be substituted without departing from the scope hereof including, without limitation, a spring clamp and a spring clip.

In one example embodiment, the locking device 50 has a pair of handles 56 and at least one pad 54 that fits orthogonally into the slot 16 of slider arm 14, the locking device engaging the female ferrule 22 and the slider arm 14 when the rotating assembly 20 and the fixed assembly 30 are connected, the at least one pad 54 inserted into the slider arm slot 16 between the pivoting pin 26 and the end of slot 16 located proximal to the female ferrule 22 such that further movement of the ferrules is prevented, thereby locking the rotating assembly 20 and the fixed assembly 30 together. Alternatively, the at least one pad 54 inserts into the slider arm slot between the pivoting pin 26 and pivoting pin 62. Further, although one pad is shown, it would be obvious to one of skill in the art that alternate quantities of pads may be substituted without departing from the scope hereof.

Figure 7C:
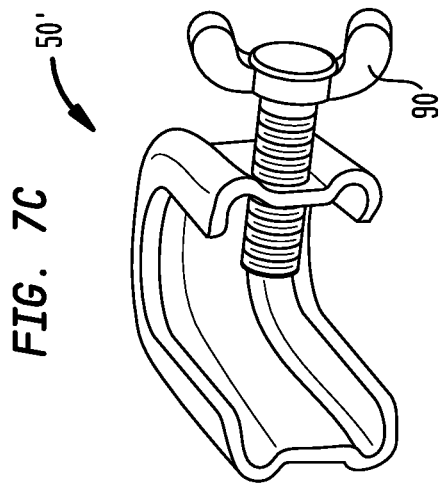
FIGS. 7A-7C are perspective views of exemplary locking mechanisms for use with the system and apparatuses for connecting rods.
Figure 7B:
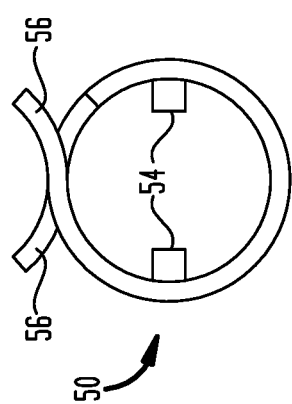
Figure 7A:
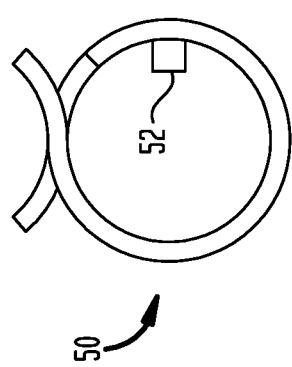

In a further example embodiment of the locking device of the system shown in FIG. 7A, the locking device 50 has a tab 52 that inserts orthogonally into the slider slot 16. In yet another example embodiment shown in FIG. 7B, the locking device 50 has a pair of pads configured for the apparatus having a pair of slider arms (for example, the embodiment explained and described above with respect to FIG. 2). In yet a further example embodiment in FIG. 7C, the locking device 50 has a "C" shaped body having a finger tightened fastener 90 passing through the arm of the "C" such that the finger tightening mechanism is located external to the body thereof. In such an embodiment, the body of the locking device 50 fits around the exterior of the ferrules and the fastener 90 may be inserted into the slider arm slot 16 as described hereinabove via activation of the finger tightening mechanism until a point at which the slider arm is tightly coupled to the body of the ferrule. The finger tightening mechanism may also be utilized for removal of locking device 50 from apparatus 12 via reverse threading or the like.

FIGS. 8A-8C demonstrate some possible shapes of the slider arm 14 of the apparatus and the system in accordance with one embodiment of the present invention. In FIG. 8A, the slider arm 14 has arcuate outer and inner surfaces 14a and 14b, respectively, conforming to the outer surface of the rod segment. FIG. 8B, the slider arm 14 has an arcuate outer surface 14a and a flat inner surface 14b. In FIG. 8C, the slider arm 14 has flat outer and inner surfaces 14a and 14b, respectively. The slider arms may also have some cavities on the top or bottom to accommodate attachment of hooks, snaps, and similar items.

Figure 6:
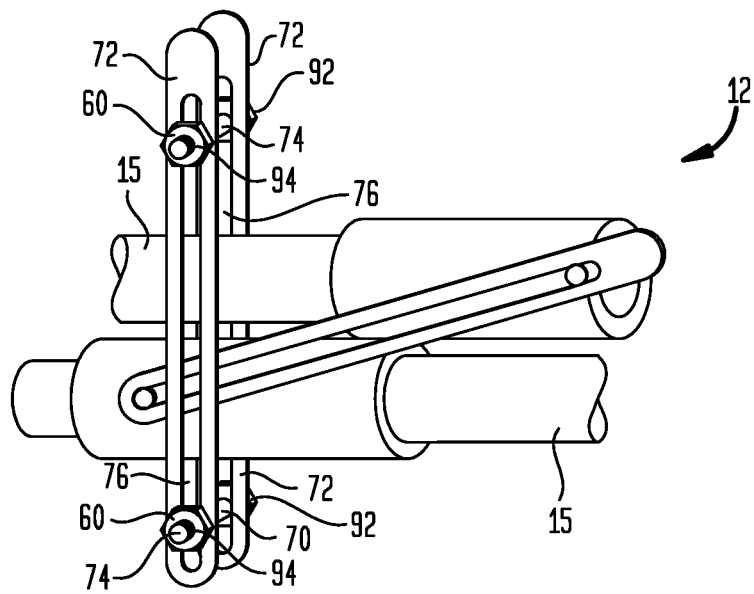
FIG. 6 is a perspective view of a bracket of the system for connecting rods in accordance with one embodiment of the present disclosure.

The system for assembling rod segments in a plurality of configurations further comprises the example embodiments of the apparatus as described herein above, the locking devices as described hereinabove and a bracket 70 as shown in FIG. 6. The bracket 70 has a pair of plates 72, each plate 72 having a longitudinal slot 76. In use, plates 72 are located approximately perpendicular to the substantially parallel rod segments 15 as shown in FIG. 6. Each bracket 70 also includes a pair of bars 74, each bar 74 having a first end with a head 92 and a second threaded end 94 for mating to a screw fastener 60. The first end head 92 has a larger diameter than the width of slot 76 such that when bar 74 is passed through slot 76, head 92 prevents passage of the end therethrough. The bars 74 insert into each end of the slot 76, and fastener 60 is threaded onto threaded end 94 external to plate 72 to tightly couple the substantially parallel connecting rods to each other. That is, the bracket 70 secures the collapsed substantially parallel rod segments 15 together when the rod segments 15 are placed between the bars 74 of the bracket 70, the plates 72 holding the rod segments 15 in an accordion position. Alternate plate types and/or alternate methods of tightening plates 72 to each other may be substituted without departing from the scope hereof.

Figure 9:
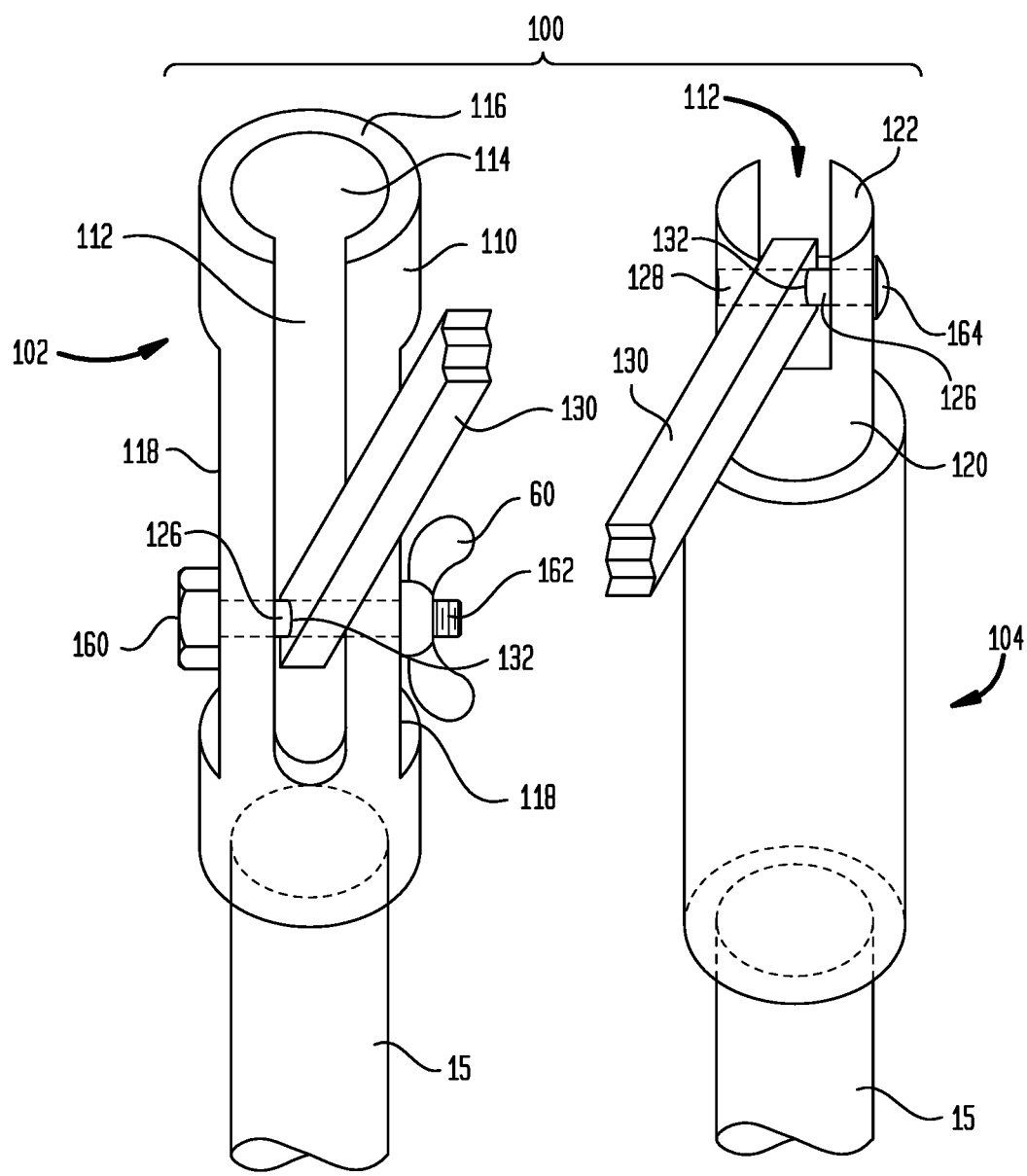
FIG. 9 is an exploded view of a further alternate example embodiment of a system and apparatus for connecting rods in accordance with an example embodiment of the present disclosure.

FIG. 9 illustrates another example embodiment of an apparatus 100 for connecting rod segments 15 in accordance with an alternate embodiment of the present invention. The apparatus 100 has a connector arm 130 fixed at a first end to a first ferrule and slidably engaged at a second end with a second ferrule.

The apparatus 100 has a fixed assembly 102 having a female ferrule 110 coupled to a first rod segment 15, the female ferrule having a wall 116 defining a cavity 114 opposite the first rod segment 15, the wall 116 defining an inner diameter of the female ferrule 110. The female ferrule 110 has a pair of opposing slits 118 in the cavity wall 116. The female ferrule 110 also has a slot 112 on the cavity wall 116 configured for receiving the connector arm 130, the slot 112 substantially equidistant from the slits 118. The connector arm 130 couples to the female ferrule 110 by a pivoting pin 126 that passes through both slits 118 and an opening 132 on the connector arm 130. Pivoting pin 126, a rivet as a non-limiting example, is held within female ferrule 110 via its head 160 located at a first end and a second end having a peened head as a non-limiting example, the heads having a diameter greater than the width of slit 118. Or, as depicted in FIG. 9, pin 126 has a threaded second end 162 coupled to a fastener 60, the fastener 60 also having a diameter larger than the width of slit 118. In the depicted embodiment, fastener 60 is threaded to second end 162. However, alternate fasteners and alternate methods of holding pin 126 within slits 118 may be substituted without departing from the scope of the present invention. The pivoting pin 126 freely traverses the slits 118, and the connector arm rotates around the pivoting pin 126 and freely traverses the slot 112 in the proximity of the slits 118.

The apparatus 100 has a rotating assembly 104 having a male ferrule 120 coupled to a second rod segment 15, the male ferrule 120 having a dowel 122 opposite the second rod segment 15. The dowel 122 defines an outer diameter of the male ferrule 120 slightly less than the inner diameter of the female ferrule 110, the male ferrule 120 configured for snugly inserting into the cavity 114 of the female ferrule. The male ferrule 120 has a pair of opposing openings 128 on the dowel 122 and a slot 112 on the top of the dowel 122 configured for receiving the connector arm 130, the slot 112 substantially equidistant from the openings 128.

The connector arm 130 couples to the male ferrule 120 by the pivoting pin 126 extending through the opening 132 on the connector arm 130 and the openings 128 on the dowel 122, the connector arm 130 within the slot 112 and between the dowel walls 122 and freely rotating around the pivoting pin 126. Pivoting pin 126 is held within opening 132 and openings 128 via heads 164 at either end of pivoting pin 126 which have a diameter greater than the diameter of openings 128.

A method of connecting rod segments using the apparatus 100 begins with aligning the rotating assembly 104 with the fixed assembly 102 and inserting the male ferrule 120 into the female ferrule 110 connecting the rod segments 15 as demonstrated in FIG. 10A.

FIGS. 10B through 10D show how the apparatus 100 collapses the connection of the rod segments. The male ferrule 120 withdraws from the female ferrule 110 and the connector arm 130 rotates around the pivoting pins 126, the pivoting pin of the female ferrule 110 traversing the slot 112 of the female ferrule 110 until the rotating assembly 104 is substantially parallel to the fixed assembly 102 as shown in FIG. 10D.

In an example embodiment of the apparatus 100, the female ferrule 110 and rod segment 15 are a unitary piece and the male ferrule 120 and rod segment 15 are a unitary piece. In another example embodiment, the ferrules selectively couple to the rod segments. In yet another example embodiment, the ferrules are held in place on the rod segments by set screws as described hereinabove with respect to FIG. 3.

In yet another example embodiment of the apparatus 100, the dowel wall 122 of the male ferrule 120 has a spring loaded ball and the cavity 114 of female ferrule 110 has a corresponding indentation in the cavity wall 116 such that when the spring loaded ball is pressed down upon inserting the male ferrule 120 into the cavity 114, the ball extends into the indentation upon contact, locking the ferrules with the rod segments together as also described hereinabove with respect to FIG. 3.

The apparatus can further comprise the spring band clamps as described hereinabove with reference to FIG. 7. The clamp has at least one tab, the spring band clamp engaging the slot of the female ferrule 110 below the pivoting pin 126 connecting to the connector arm, locking the rotating assembly and fixed assembly together.

In yet a further example embodiment, the male ferrule 122 further comprises a spring clip. The apparatus 100 further comprises a bump out in the cavity 114 of the female ferrule 110, the bump out configured to accept the spring clip of the male ferrule 120 when the dowel 122 of the male ferrule 120 inserts into the cavity 114 of the female ferrule 110, the female ferrule 110 further having an opening configured for accessing the spring clip of the male ferrule 120 when withdrawing the dowel.

Another example embodiment of a system for connecting rod segments includes apparatus 100 and spring band clamp as described hereinabove with respect to FIGS. 7, 7A, and 7B and further comprises the bracket 70 illustrated in FIG. 6.

In still another embodiment, apparatus 100 may include an internal spring-loaded locking mechanism such as locking mechanism 1100 as shown in FIGS. 11A and 11B for use with embodiments of the present invention such as those shown in FIGS. 1 and 2. As seen in FIGS. 11A and 11B, depicted is internal locking mechanism 1100*a*/1100*b*, which includes, inter alia, spring-loaded clip 1102*a*/1102*b*, dowel aperture 1104*a*/1104*b*, female ferrule aperture 1106*a*/1106*b*, substantially concave indentation 1110*a*/1110*b*, and substantially concave indentation 1120*a*/1120*b*. Spring-loaded clip 1102*a*/1102*b* is located internal to dowel 34 of male ferrule 32 as shown in the cutaway views of FIGS. 11A and 11B. A first end 1108*a*/1108*b* of spring-loaded clip 1102*a*/1102*b* is located such that it extends through dowel aperture 1104*a*/1104*b*, and it is held therein due to the spring tension exerted by the body of spring-loaded clip 1102*a*/1102*b*.

During use of the apparatus 100, when a user wishes to connect the male ferrule to the female ferrule, the user depresses locking mechanism first end 1108*a*/1108*b* until the external edge thereof is substantially aligned with or is internal to dowel external wall 98. Substantially concave indentation 1110*a*/1110*b* assists the user in depression of locking mechanism first end 1108*a*/1108*b*. Once first end 1108*a*/1108*b* is in the desired position, the user may then slide dowel 34 into cavity 24 of female ferrule 22 until first end 1108*a*/1108*b* aligns with female ferrule aperture 1106*a*/1106*b* respectively. Once aligned, the spring tension of locking mechanism 1102*a*/1102*b* causes it to expand, thereby pushing first end 1108*a*/1108*b*, respectively, through aperture 1106*a*/1106*b*, respectively. This action locks male ferrule 32 to female ferrule 22 as the presence of first end 1108*a*/1108*b* within aperture 1106*a*/1106*b* does not allow a user to disengage dowel 34 from female ferrule 22 merely by pulling on male ferrule 32 and female ferrules 22 in opposing directions.

Once a user wishes to disengage dowel 34 from female ferrule 22, the user depresses locking mechanism first end 1108*a*/1108*b* until the external edge thereof is substantially aligned with or is internal to female ferrule external wall 99. Substantially concave indentation 1120*a*/1120*b* assists the user in depression of locking mechanism first end 1108*a*/1108*b*. Once first end 1108*a*/1108*b* is in the desired position, the user may then slide dowel 34 out of cavity 24 of female ferrule 22. Once first end 1108*a*/1108*b* is removed from cavity 24 of female ferrule 22, the spring tension of locking mechanism 1102*a*/1102*b* causes it to expand, thereby pushing first end 1108*a*/1108*b*, respectively, through aperture 1104*a*/1104*b*, respectively. This action returns first end 1108*a*/1108*b* to a position in which it is again available to be depressed by the user when the user again wishes to insert the dowel into cavity 24 of female ferrule 22. Although locking mechanism 1100*a*/1100*b* is shown as including substantially concave indentation 1110*a*/1110*b*, and substantially concave indentation 1120*a*/1120*b*, one or both indentations may be omitted without departing from the scope hereof.

Further, the body of spring-loaded clip 1102*a*/1102*b* can be of any shape that allows tension to be exerted on first end 1108*a*/1108*b*. For example, as seen in FIG. 11A, spring-loaded clip 1102*a*/1102*b* may have a substantially circular head 1122 with two legs 1124*a*/1124*b* that extend therefrom, legs 1124*a*/1124*b* angled away from each other. Or, alternatively, as seen in FIG. 11B, spring-loaded clip 1102*b* has a semi-circular head 1130 with legs 1132*a* and 1132*b* that extend linearly from the ends of head 1130 and are substantially parallel to each other. However, alternate shapes and forms of spring-loaded clips may be substituted without departing from the scope hereof.

Finally, the spring-loaded clip 1102*a* may have a second end 1110*a* that is seated in indentation 1140 of dowel external wall 98 in a location that is substantially opposite dowel aperture 1104*a*. In some instances, the anchoring of second end of the spring-loaded clip in a dowel wall indentation may further fix the spring-loaded clip in place and operate to prevent movement thereof. However, such anchoring may be omitted without departing from the scope hereof.

Referring to the exemplary embodiment 1200 depicted in FIG. 12A and FIG. 12B, the apparatus 1200 may include a modification of the embodiment depicted in FIG. 3. The embodiment of FIG. 3 locks the rod segments 15 together in that the dowel 34 of the male ferrule 32 has a spring loaded ball 46, and the cavity 24 of female ferrule 22 has a corresponding indentation 42, such that when the spring loaded ball 46 is pressed down upon inserting the dowel 34 into the female ferrule cavity 24, the ball 46 extends into the indentation 42 upon contact, locking the female ferrule 22 to the male ferrule 32 and thereby also locking the rod segments 15 together. The rounded nature of the surface of the ball 46 allows a user to disengage dowel 34 from female ferrule 22 merely by pulling on male ferrule 32 and female ferrules 22 in opposing directions, creating a stable connection, but not a securely locked connection.

Similar to the embodiment of FIG. 3, embodiment 1200 of FIG. 12A depicts an apparatus 1200 having a spring-loaded push-button lock mechanism 1202 that includes a spring-loaded push-button 1204 seated on the dowel 34 of the male ferrule 32, and a cavity aperture 1206 traversing the cavity 24 of female ferrule 22. Spring-loaded push-button 1204 may extend through a dowel aperture 1204*a* on the dowel 34 and connect to, or is integral to, an internal spring 1204*b* seated inside dowel 34. As shown in FIG. 12B, dowel aperture 1204*a* may be comparable to dowel aperture 1104*a* in FIG. 11A and may include a substantially concave indentation 1210 comparable to substantially concave indentation 1110*a*. Likewise, cavity aperture 1206 may be comparable to female ferrule aperture 1106*a* and may include a substantially concave indentation 1220 comparable to substantially concave indentation 1120*a*. Internal spring 1204*b* may have an end 1204*c* that is seated in indentation 1240 of dowel external wall 98 in a location that is substantially opposite dowel aperture 1204*a*.

To lock and engage the male ferrule 32 and the female ferrule 22, the spring-loaded push-button 1204 is pushed down to insert the dowel 34 into the female ferrule cavity 24, the dowel 34 is inserted into the female ferrule cavity 24 until the push-button 1204 reaches and is substantially aligned with the cavity aperture 1206. At this point, internal spring 1204*b* causes the push-button 1204 to extend into and through the cavity aperture 1206 thereby locking the rod segments 15 together. To unlock and disengage the male ferrule 32 from the female ferrule 22, the push-button 1204 is pushed through the cavity aperture 1206, the push-button 1204 is held down and clear of the cavity aperture 1206, and the dowel 34 is removed from the cavity 24.

As shown in FIGS. 12A and 12B, the dowel 34 and cavity 24 may be proportioned such that fully inserting the dowel 34 into cavity 24 properly aligns push-button 1204 with cavity aperture 1206 to facilitate their engagement, creating a maximum travel of the male ferrule 32 into female ferrule 22 to facilitate correct depth alignment of push-button 1204 with cavity aperture 1206. Correct rotational alignment of push-button 1204 with cavity aperture 1206 also is facilitated by a fixed orientation of male ferrule 32 with respect to female ferrule 22, due to slider arms 14 and pivoting pins 26, 62 inhibiting rotation of male ferrule 32 with respect to female ferrule 22, such that push-button 1204 rotationally aligns with cavity aperture 1206.

Figure 13:
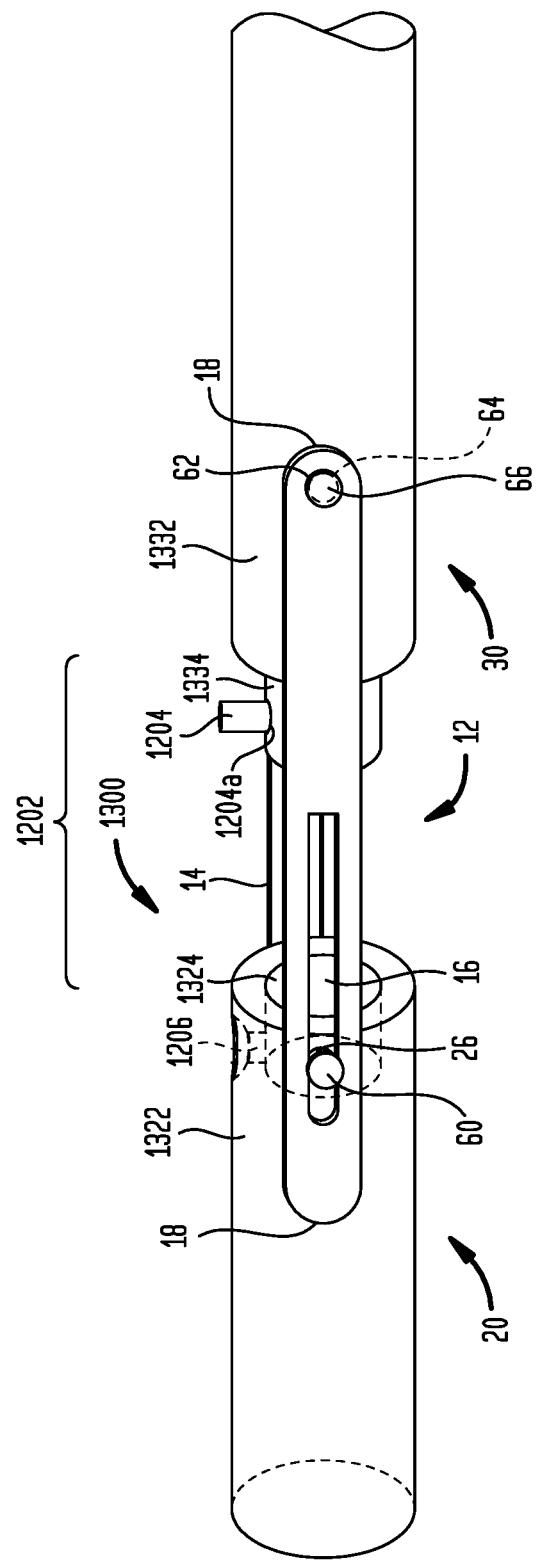
FIG. 13 depicts the spring-loaded push-button lock mechanism of FIG. 12A used with an exemplary unibody construction embodiment of the present invention in accordance with aspects of the invention.

Referring to the exemplary embodiment 1300 depicted in FIG. 13, the apparatus 1300 for connecting rod segments may integrate the functions of the male ferrule 32 and female ferrule 22 (such as those shown in FIGS. 12A and 12B) with the rod segments 15 (such as those shown in FIGS. 12A and 12B) thereby eliminating the male ferrule 32, female ferrule 22, and the associated cavities 25, 36, and further eliminating the need for insertion of rod segments 15 (FIGS. 12A and 12B) into the cavities 25, 36, and the need to secure rod segments 15 into cavities 25, 36, such as with use of set screw 40.

More specifically, apparatus 1300 includes a female rod segment 1322 and a male rod segment 1332. Similar to the embodiment of FIGS. 12A and 12B, embodiment 1300 of FIG. 13 depicts an apparatus 1300 having a spring-loaded push-button lock mechanism 1202 that includes a spring-loaded push-button 1204 seated on the dowel 1334 of the male rod segment 1332, and a cavity aperture 1206 traversing the cavity 1324 of the female rod segment 1322 that operates in the same manner as described here in with respect to FIGS. 12A and 12B, except that the components are located in female and male rod segments instead of female and male ferrules, respectively. That is, spring-loaded push-button 1204 may extend through a dowel aperture 1204*a* on the dowel 1334 and connect to, or is integral to, an internal spring 1204*b* seated inside dowel 1334 (similar to that shown in FIG. 12B for dowel 34). As shown in FIG. 12B, dowel aperture 1204*a* may include a substantially concave indentation 1210. Likewise, cavity aperture 1206 may include a substantially concave indentation 1220 as described herein with respect to FIGS. 12A and 12B. Internal spring 1204*b* may have an end 1204*c* that is seated in indentation 1240 of dowel external wall 98 of dowel 1334 in a location that is substantially opposite dowel aperture 1204*a*.

The rod segments 15 and 1315 described herein may be made of any suitable material including, but not limited to, metal, epoxy, thermoplastic or fiberglass, and metal, such as aluminum.

Referring to the exemplary apparatus 1400 depicted in FIG. 14A and FIG. 14B, the unibody construction of embodiment 1300 of FIG. 13 having slider arms 14 may be modified to replace the slider arms 14 with an elastomeric connector 1414 on either or both of the opposing sides of the rod segments 1322 and 1332. The elastomeric connector 1414 is adapted to connect the female rod segment 1322 and the male rod segment 1332 while allowing the female rod segment 1322 and the male rod segment 1332 a limited range of motion relative to each other. This limited range of motion relative to each other allows the dowel 1334 to be inserted into and removed from the dowel cavity 1324. The elastomeric connector 1414 preferably is a flexible and stretchable band or ring made of elastic material that preferably is sized so that the elastomeric connectors 1414 are slightly stretched when the male rod segment 1332 and the female rod segment 1322 are locked together, which helps to keep the elastomeric connectors 1414 close to the rod segments 1322 and 1332 and not loose and susceptible to getting caught on things surrounding the apparatus 1400. Elastomeric connectors 1414 preferably need to be stretched somewhat more to unlock and disengage the male rod segment 1332 and the female rod segment 1322. The elastomeric connector 1414 may be connected to the rod segments in a variety of ways, such as using pins 26, 62 (See FIGS. 12A and 12B), using locking device 50, using adhesives, or using holes 1402 through the rod segments 1322 and 1332, as in FIG. 14B.

In FIG. 14B, the elastomeric connectors 1414 traverse through holes 1402 and either are anchored internally within the rod segments or are interconnected to form an O-ring that passes through the holes 1402. Although the elastomeric connector 1414 shown in FIG. 14 C is substantially linear with two substantially T-shaped ends, alternate shapes may be substituted without departing from the scope hereof. Further, elastomeric connector 1414 may be in a variety of forms including, but not limited to, flat, round, and curved without departing from the scope hereof.

Figure 14C:
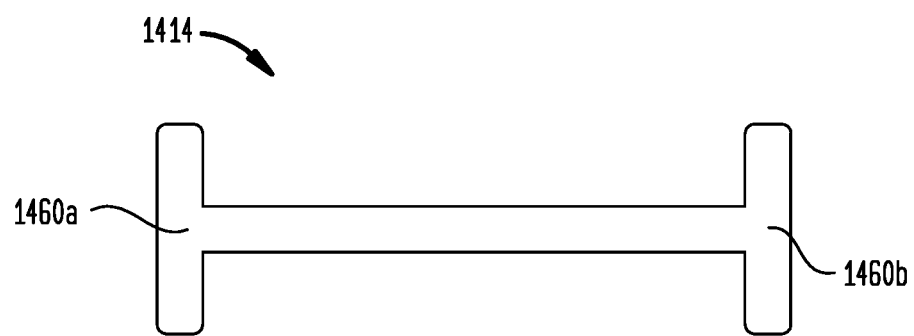
Figure 14D:
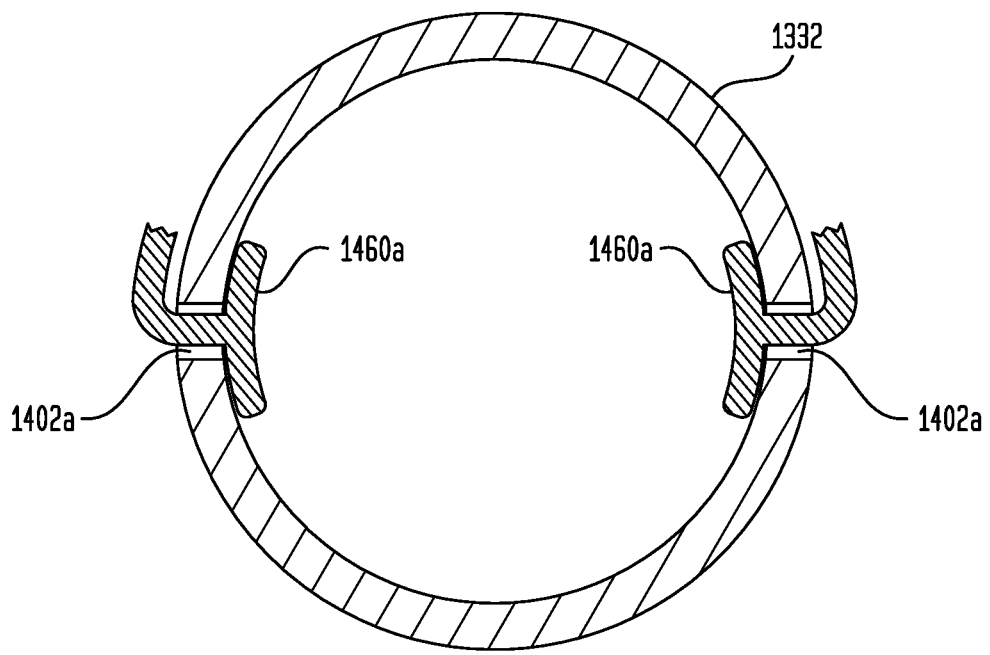
FIG. 14D depicts a cross-sectional view taken along lines 14D-14D of FIG. 14A.

Or, in some embodiments, connector 1414 is as shown in FIG. 14C and includes ends 1460a and 1460b, which may be formed in the shape of a T relative to the longitudinal axis of connector 1414, although alternate shapes may be substituted without departing from the scope hereof. In such embodiments, the two halves of an end 1460 may be aligned or otherwise squeezed together and threaded through an aperture such as aperture 1402. After passing therethrough, the ends 1460 will naturally separate and/or expand, thereby holding connector 1414 to the corresponding rod segment 1322 or 1332 as shown in the cross-sectional view of FIG. 14D.

Referring to the exemplary apparatus 1500 depicted in FIGS. 15A-15C, the unibody construction of apparatus 1400 of FIGS. 14A and 14B having elastomeric connectors 1414 may be modified to remove the elastomeric connectors 1414 and the corresponding connections to the rod segments such as pins 26, 62, thus resulting in apparatus 1500. Apparatus 1500 includes push-button 1204 that engages cavity aperture 1206 as dowel 1334 of male rod connector 1332 is fully inserted into cavity 1324 of female rod connector 1322. Unlike apparatus 1300 and 1400, apparatus 1500 omits slider arms 14 and elastomeric connectors 1414, and therefore embodiment 1500 cannot rely on these omitted components or components similar thereto to facilitate rotational alignment of the push-button 1204 with cavity aperture 1206. That is to say, in the absence of slider arms or such restricting the rotation of rod segments 1322, 1332, the female rod segment 1322 and male rod segment 1332 are free to rotate with respect to each other (e.g., rotate clockwise or counterclockwise along the lengthwise axis of the rod segments). If the dowel 1334 and cavity 1324 are cylindrical (i.e., having a circular cross-section), the possibility exists that a user accidentally may rotationally misalign the dowel 1334 within cavity 1324, such that push-button 1204 does not align with aperture 1206 once fully inserted, which would prevent the pushbutton 1204 from engaging the aperture 1206 and locking the rod segments. The same potential for rotational misalignment exists with other embodiments in which the dowel 1334 and cavity 1324 are free to rotate and have symmetrical cross-sections, such as an octagon, heptagon, hexagon, pentagon, and square. As such, embodiment 1500 may incorporate other features to facilitate proper rotational alignment, such as forming dowel 1334 and cavity 1324 such that dowel 1334 may be inserted into cavity 1324 in only one fashion, like a key in a keyhole (e.g., having a cross-section forming a single matching orientation, such as an isosceles triangle, as shown in FIG. 15C) that corresponds to proper rotational alignment of the push-button 1204 with cavity aperture 1206.

As shown in FIG. 15C, dowel 1334 has three exterior dowel walls 1500 and cavity 1324 has three interior cavity side walls 1502, both sets of which are arranged to form an isosceles triangle. In such an embodiment in which the dowel and cavity have matching cross-sections, dowel 1334 will fit in cavity 1324 in only a single rotational alignment, in which the isosceles-shaped dowel 1334 is substantially aligned with the isosceles-shaped inner cavity walls 1502. triangles of the respective cross-sections are aligned. By virtue of this single matching orientation, dowel 1334 must be aligned with cavity 1324 in order to be inserted, and pushbutton 1204 consequently will line up with aperture 1206 once the dowel 34 is inserted fully. Whether the dowel 1334 may be inserted in the cavity 1324 in only one rotational orientation or multiple rotational orientations, the two rod segments preferably are aligned visually by the user using pushbutton 1204 and aperture 1206 as a guide.

Referring to the exemplary embodiment 1600 of FIGS. 16A-16B, the apparatus 1300 of FIG. 13 may be modified to form apparatus 1600 for connecting rod segments. Apparatus 1600 includes a rod segment 1615 adapted to couple to a male ferrule 1632. Rod segment 1615 includes a cavity 1636, and cavity 1636 may extend inside only a portion of rod segment 1615, or cavity 1636 may extend through the entirety of rod segment 1615, whereby rod segment 1615 would be hollow. Male ferrule 1632 includes a male tube 1638 adapted to slide inside a rod segment 1615. Male ferrule 1632 may be integrally formed with male tube 1638 as a single unit, or male ferrule 1632 may be a band positioned on male tube 1638 and held in place by securing means, such as, but not limited to, epoxy, adhesive, threading, set screw, solder, and friction. The male tube 1638 is adapted to slide inside cavity 1636 of rod segment 1615. Male tube 1638 may be adapted to be removable from cavity 1636, or to be irremovable from cavity 1636 by being held in place by securing means, such as, but not limited to, epoxy, adhesive, threading, set screw, solder, or friction. As depicted in FIGS. 16A-16B, to the right of male ferrule 1632 is the rod segment 1615 connecting to male tube 1638, and to the left of male ferrule 1632 are dowel 1334 and push-button 1204, the latter two being equivalent to the same components shown in FIG. 13 and as described herein. FIG. 16A depicts apparatus 1600 in a partially-separated state, whereas FIG. 16B depicts the apparatus 1600 in a fully-connected state, with male tube 1638 fully inserted in cavity 1636, and push-button 1204 extending through aperture 1206. Although not depicted in FIGS. 16A-16B, a male tube 1638 and a rod segment 1615 also could be positioned on the side of the female rod segment 1322, wherein the female rod segment 1322 could include a rod segment 1615 enclosing a male tube 1638 extending from a female ferrule 22.

The systems and methods of the present invention including, but not limited to, all of the embodiments shown and described herein may be made with any suitable manufacturing process including, but not limited to, tool and die machining, unibody assembly, and tubular assembly.

Further, the components of the various embodiments discussed and depicted herein may be swapped and/or substituted between the various embodiments shown without departing from the scope hereof. For example, although the elastomeric connector 1414 is shown in conjunction with the female rod segment 1322 and male rod segment 1332 depicted in FIGS. 14A and 14B, the elastomeric connectors may be used with alternate rod segments and/or ferrules without departing from the scope hereof. Similarly, one or more of the slider arms depicted in, for example, FIG. 13 may be substituted for one or both of the elastomeric connectors without departing from the scope hereof. Also, any of the depicted embodiments may include a spring-loaded, push-button locking mechanism without departing from the scope hereof.

The depicted connection systems and apparatuses may be used with a variety of collapsible structures including, but not limited to, collapsible tent poles, collapsible frameworks for canopies (e.g., wedding canopies), gazebos, trellises and kiosks, collapsible walking aids (e.g., crutches, canes, walking poles, walking sticks and other walking aids), struts of a collapsible airplane wing, and umbrellas (e.g., beach umbrellas).

All of the rod segments, tubes, etc. shown herein may be made of any suitable material including, but not limited to, metal, epoxy, thermoplastic or fiberglass, and metal, such as aluminum. And such materials may be heavy duty materials or off-the-shelf style lighter duty materials without departing from the scope hereof.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

I claim:

1. An apparatus for connecting rod segments comprising: an elastomeric connector comprising an O-ring;
a first assembly having a female ferrule having a female body, the female ferrule coupling to a first of the rod segments at a first end of the female body, the female ferrule having a dowel cavity opposite the first rod segment and recessed in a second end of the female body;
a second assembly having a male ferrule having a male body, the male ferrule coupling to a second of the rod segments at a first end of the male body, the male ferrule having a dowel opposite the second rod segment coupled to a second end of the male body configured for mating with the dowel cavity of the female ferrule; and
a spring-loaded push-button locking mechanism having a spring-loaded push-button seated on the dowel of the male ferrule, and a cavity aperture traversing the dowel cavity of female ferrule;
wherein the elastomeric connector connects the first assembly and the second assembly in that the O-ring traverses holes in the rod segments;
wherein the elastomeric connector is a flexible and stretchable band made of elastic material sized so that the elastomeric connector is slightly stretched when the male ferrule and the female ferrule are locked together; and,
wherein the dowel is adapted to be inserted into the dowel cavity upon depressing the push-button into the dowel to connect the first rod segment on the first assembly to the second rod segment on the second assembly, and wherein the dowel is adapted to be removed from the dowel cavity upon depressing the push-button through the cavity aperture to disconnect the first rod segment on the first assembly from the second rod segment on the second assembly.

2. An apparatus for connecting rod segments comprising:
a first elastomeric connector having a first end and a second end;
a first assembly having a female ferrule having a female body, the female ferrule coupling to a first of the rod segments at a first end of the female body, the female ferrule having a dowel cavity opposite the first rod segment and recessed in a second end of the female body, the first end of the first elastomeric connector extending from an outwardly facing surface of the female body, in a location external to and adjacent a first perimeter of the female body of female ferrule;
a second assembly having a male ferrule having a male body, the male ferrule coupling to a second of the rod segments at a first end of the male body, the male ferrule having a dowel opposite the second rod segment coupled to a second end of the male body configured for mating with the dowel cavity of the female ferrule, the second end of the first elastomeric connector extending from an outwardly facing surface of the male body of the male ferrule, in a location external to and adjacent a second perimeter of the male body of the male ferrule; and
a spring-loaded push-button locking mechanism;
wherein the elastomeric connector is adapted to connect the first assembly and the second assembly, while allowing the first assembly and the second assembly a limited range of motion relative to each other, to allow the dowel to be inserted into the dowel cavity to connect the first rod segment on the first assembly to the second rod segment on the second assembly, and to allow the dowel to be removed from the dowel cavity to disconnect the first rod segment on the first assembly from the second rod segment on the second assembly;
wherein the first elastomeric connector is a flexible and stretchable band made of elastic material sized so that the first elastomeric connector is slightly stretched when the male ferrule and the female ferrule are locked together; and,
wherein the first elastomeric connector is an O-ring that traverses holes in the rod segments.

3. The apparatus according to claim 2, wherein the spring-loaded push-button locking mechanism includes a spring-loaded push-button seated on the dowel of the male ferrule, and a cavity aperture traversing the dowel cavity of female ferrule.

4. The apparatus according to claim 3, wherein the spring-loaded push-button extends through a dowel aperture on the dowel and is connected to an internal spring seated inside dowel, and wherein the internal spring presses the push-button through the dowel via the dowel aperture for inserting into the cavity aperture upon insertion of the dowel into the dowel cavity.

5. The apparatus according to claim 2, wherein the apparatus further comprises the rod segments in a unibody construction, wherein the female ferrule is integrated into the first of the rod segments, and wherein the male ferrule is integrated into the second of the rod segments.

6. The apparatus according to claim 2, wherein the second assembly includes a male tube coupled to the male ferrule, extending toward the second of the rod segments, and adapted to be inserted inside a cavity of the second of the rod segment, and wherein the spring-loaded push-button locking mechanism is located between the male ferrule and the female ferrule and on a side of the male ferrule opposite the male tube.

7. An apparatus for connecting rod segments comprising:
   a slider arm having a pair of solid ends and a through slot extending longitudinally through at least a portion of the slider arm and proximal to a first of the pair of solid ends;
   a rotating assembly having a female ferrule having a female body, the female ferrule coupling to a first of the rod segments at a first end of the female body, the female ferrule having a dowel cavity opposite the first rod segment and recessed in a second end of the female body, the rotating assembly having a first pivoting pin extending from an outwardly facing surface of the female body, the first pivoting pin passing through the through slot and coupling the slider arm to the female ferrule in a location external to and adjacent a first perimeter of the female body of female ferrule;
   a fixed assembly having a male ferrule having a male body, the male ferrule coupling to a second of the rod segments at a first end of the male body, the male ferrule having a dowel opposite the second rod segment coupled to a second end of the male body configured for mating with the dowel cavity of the female ferrule, the fixed assembly having a second pivoting pin extending from an outwardly facing surface of the male body of the male ferrule, the second pivoting pin passing through an aperture in a second of the pair of solid ends and coupling the slider arm to the male ferrule in a location external to and adjacent a second perimeter of the male body of the male ferrule; and
   a first elastomeric connector having a first end connected to the rotating assembly and a second end connected to the fixed assembly such that the first elastomeric connector is positioned on an external side of the male and female ferrules opposite to the slider arm,
   wherein the first elastomeric connector is a flexible and stretchable band made of elastic material sized so that the elastomeric connector is slightly stretched when the male ferrule and the female ferrule
   are locked together; and
   wherein the slider arm
   wherein the slider arm and the rotating assembly are adapted to pivot around the second pivoting pin, and the first pivoting pin is adapted to slide through the through slot as the dowel inserts into the dowel cavity to connect the first rod segment on the rotating assembly to the second rod segment on the fixed assembly.

8. The apparatus according to claim 7, wherein at least one of the group consisting of the first rod segment and the second rod segment is removably coupled to a respective one of the female ferrule and the male ferrule.

9. The apparatus according to claim 8, wherein at least one of the group consisting of the first rod segment and the second rod segment inserts into a rod cavity located in a respective one of the female ferrule and the male ferrule, wherein the male ferrule rod cavity is located at an end opposite the dowel and the female ferrule rod cavity is located at an end opposite the dowel cavity.

10. The apparatus according to claim 9 further comprising:
    at least one set screw passing through a wall of at least one of the group consisting of the male body of the male ferrule and the female body of the female ferrule;
    wherein tightening of the set screw locks at least one of the group consisting of the first rod segment and the second rod segment in the rod cavity; and
    wherein loosening of the set screw enables at least one of the group consisting of the first rod segment and the second rod segment to be removed from the rod cavity.

11. The apparatus according to claim 7, wherein at least one of the group consisting of the first pivoting pin and the second pivoting pin includes a threaded end for mating with a fastener.

12. The apparatus according to claim 11, wherein the fastener is one of the group consisting of a thumb screw, a wing nut, an acorn nut, a set screw, and a lock nut.

13. The apparatus according to claim 7, further comprising a spring-loaded push-button locking mechanism, wherein the spring-loaded push-button locking mechanism includes a spring-loaded push-button seated on the dowel of the male ferrule, and a cavity aperture traversing the dowel cavity of female ferrule.

14. The apparatus according to claim 13, wherein the spring-loaded push-button extends through a dowel aperture on the dowel and is connected to an internal spring seated inside dowel, and wherein the internal spring presses the push-button through the dowel via the dowel aperture and is adapted to insert the push-button into the cavity aperture upon insertion of the dowel into the dowel cavity.

15. The apparatus according to claim 7, wherein a cross section of the rod segment is selected from one of the group consisting of substantially circular, substantially ovate, substantially square, substantially rectangular, and substantially triangular.

16. The apparatus according to claim 7, wherein the apparatus further comprises the rod segments in a unibody construction, wherein the female ferrule is integrated into the first of the rod segments, and wherein the male ferrule is integrated into the second of the rod segments.

17. The apparatus according to claim 7, further comprising a spring-loaded push-button locking mechanism, wherein the fixed assembly includes a male tube coupled to the male ferrule, extending toward the second of the rod segments, and adapted to be inserted inside a cavity of the second of the rod segment, and wherein the spring-loaded push-button locking mechanism is located between the male ferrule and the female ferrule and on a side of the male ferrule opposite the male tube.

* * * * *